US008027044B2

(12) United States Patent
Sato et al.

(10) Patent No.: US 8,027,044 B2
(45) Date of Patent: Sep. 27, 2011

(54) IMAGE FORMING APPARATUS, PRINT JOB PROCESSING METHOD, AND PROGRAM

(75) Inventors: Mitsuhiko Sato, Kashiwa (JP); Hidenori Sunada, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 12/525,747

(22) PCT Filed: Mar. 19, 2008

(86) PCT No.: PCT/JP2008/055809

§ 371 (c)(1), (2), (4) Date: Aug. 4, 2009

(87) PCT Pub. No.: WO2008/117841

PCT Pub. Date: Oct. 2, 2008

(65) Prior Publication Data

US 2010/0091311 A1 Apr. 15, 2010

(30) Foreign Application Priority Data

Mar. 23, 2007 (JP) ................................ 2007-077554

(51) Int. Cl.
*G06K 15/00* (2006.01)
*B65H 33/04* (2006.01)

(52) U.S. Cl. .................................. 358/1.12; 270/58.01

(58) Field of Classification Search .................. 358/1.2, 358/471, 1.12, 474, 468, 407; 270/58.02, 270/58.14, 58.01; 271/240, 9.03
See application file for complete search history.

(56) References Cited

U.S. PATENT DOCUMENTS

| | | | | |
|---|---|---|---|---|
| 4,986,520 | A * | 1/1991 | Shido et al. | 270/58.14 |
| 5,531,430 | A * | 7/1996 | Tokunoh | 270/58.02 |
| 5,722,650 | A | 3/1998 | Yamamoto et al. | |
| 5,735,515 | A | 4/1998 | Hayashi et al. | |
| 5,769,406 | A | 6/1998 | Sato et al. | |
| 5,778,300 | A | 7/1998 | Murakami et al. | |
| 6,085,913 | A | 7/2000 | Aiko et al. | |
| 6,374,077 | B1 | 4/2002 | Hirai et al. | |
| 7,684,066 | B2 * | 3/2010 | Shirai | 358/1.14 |
| 2002/0131786 | A1 | 9/2002 | Sato et al. | |
| 2002/0186391 | A1 * | 12/2002 | Kimizuka et al. | 358/1.12 |
| 2003/0214091 | A1 | 11/2003 | Suzuki et al. | |
| 2007/0009278 | A1 * | 1/2007 | Ohnishi et al. | 399/82 |
| 2007/0057446 | A1 | 3/2007 | Nishimura et al. | |
| 2007/0071465 | A1 * | 3/2007 | Hamby et al. | 399/45 |

(Continued)

FOREIGN PATENT DOCUMENTS

JP 7-214936 A 8/1995

(Continued)

*Primary Examiner* — Jerome Grant, II

(74) *Attorney, Agent, or Firm* — Fitzpatrick, Cella, Harper & Scinto

(57) ABSTRACT

An image forming apparatus which makes it possible to perform image forming processing and post-processing efficiently. A job controller divides a single print job into a plurality of print jobs according to the processing capability of a post-processing apparatus. A print controller causes a printer section to perform sequential operations according to the split print jobs, to form a plurality of sets of printed sheet bundles. The sets of sheet bundles formed in association with the respective print jobs and stacked on a stacker by the operation of the print controller are sequentially brought to the post-processing apparatus, and the post-processing apparatus sequentially performs post-processing on the supplied sets of sheet bundles.

15 Claims, 21 Drawing Sheets

U.S. PATENT DOCUMENTS

2007/0076242 A1* 4/2007 Kanai .......................... 358/1.14
2007/0201071 A1* 8/2007 Yamada et al. .............. 358/1.13
2007/0223029 A1* 9/2007 Nonaka ........................ 358/1.14
2007/0231037 A1* 10/2007 Iida et al. ...................... 399/407
2008/0006993 A1* 1/2008 Nomura et al. ............... 271/240
2008/0024807 A1* 1/2008 Matsuda ...................... 358/1.12
2008/0049247 A1* 2/2008 Asai et al. .................... 358/1.15
2008/0124104 A1* 5/2008 Takeuchi ........................ 399/45
2008/0174793 A1* 7/2008 Mutsuno ........................ 358/1.6
2008/0192281 A1* 8/2008 Hagiwara .................... 358/1.15
2008/0258374 A1* 10/2008 Inoue ........................... 271/9.03
2008/0266592 A1* 10/2008 Brougham et al. .......... 358/1.15
2009/0217268 A1* 8/2009 Pandit et al. .................. 718/100

FOREIGN PATENT DOCUMENTS

JP 9-240197 A 9/1997
JP 10-029755 A 2/1998
JP 2002-268502 A 9/2002
JP 2003-2501 A 1/2003
JP 2003-335448 A 11/2003

* cited by examiner

FIG. 11

| APPARATUS | PROCESSING CAPABILITY |
|---|---|
| OFF-LINE POST-PROCESSING APPARATUS 1 | 0.5 BUNDLE/MINUTE |
| OFF-LINE POST-PROCESSING APPARATUS 2 | 0.2 BUNDLE/MINUTE |
| OFF-LINE POST-PROCESSING APPARATUS 3 | 0.1 BUNDLE/MINUTE |

FIG. 12

| | J1 | J2 | J3 | J4 |
|---|---|---|---|---|
| i | 10 | 20 | 40 | 80 |
| Tp | 10 | 20 | 40 | 80 |
| Tf | 20 | 40 | 80 | 160 |
| e | 20 | 40 | 80 | 160 |
| Z | 140 | 120 | 80 | 0 |
| DISCHARGER | STACKER 5 | STACKER 6 | STACKER 5 | STACKER 6 |

IMAGE FORMING APPARATUS, PRINT JOB PROCESSING METHOD, AND PROGRAM

TECHNICAL FIELD

The present invention relates to an image forming apparatus, a print job processing method, and a program, and more particularly to an image forming apparatus that forms images on sheets and then causes a post-processing apparatus to perform post-processing on the sheets brought thereto, a print job processing method applied to the image forming apparatus, and a program for causing a computer to execute the print job processing method.

BACKGROUND ART

Conventionally, there has been known a printing system comprised of an image forming apparatus, such as a printer, a facsimile machine, or a copying machine, and a post-processing apparatus, such as a finisher or a bookbinding machine. A post-processing apparatus performs post-processing, such as bookbinding, stapling, and so forth, on a sheet bundle output from an image forming apparatus. Post-processing apparatuses include an off-line post-processing apparatus, wherein a sheet bundle output from an image forming apparatus is temporarily stacked on a stacking device, such as a sheet discharge tray or a stacker, without being directly transferred to the post-processing apparatus, and then an operator brings the sheet material to the post-processing apparatus and causes the post-processing apparatus to perform processing.

On the other hand, a printing method called on-demand printing for performing printing of various kinds in small lots has been widely employed in image forming apparatuses, such as digital copying machines. This on-demand printing enables an image forming apparatus to meet the demand for printing of various kinds in small lots, and change print contents with ease. Therefore, the on-demand printing is suitable for printing product manuals, catalogs, booklets for individual users, prints for distribution in offices, and the like.

Further, there are various kinds of post-processing apparatuses each of which makes sheet bundles output from an associated image forming apparatus into booklets, such as catalogs or manuals. The post-processing apparatuses include, for example, a case binding machine that applies glue to a sheet bundle, bonds a cover sheet to the sheet bundle, and then performs cut-off processing on the same, a saddle stitching bookbinding machine that performs stapling in the center of a sheet bundle and then folds the same in two, and a ring binding machine that punches holes in a sheet bundle and binds the sheet bundle into a book using a special-purpose helical member.

By the way, when a comparison is made between a time period required for an image forming apparatus to complete printing and a time period required for a post-processing apparatus to complete post-processing so as to produce a booklet, the latter is generally longer than the former, though an exceptional case can occur depending on the number of pages of a booklet. This is because it is required to manually set sheet bundles one by one in the post-processing apparatus off-line and then start processing by the post-processing apparatus, though processing time taken by the off-line post-processing apparatus is shorter.

For this reason, in on-demand printing, as the number of booklets to be produced increases, in addition to time which it takes for the image forming apparatus to output sheet bundles, it takes a longer time for the post-processing apparatus to complete post-processing, and hence it takes a long time to obtain the booklets after the start of the printing.

Further, an operator, who handles the post-processing apparatus operating off-line and carries out other work while checking the operating state of the image forming apparatus, cannot always fetch a sheet bundle output from the image forming apparatus upon completion of the operation of the image forming apparatus. In such a case, the sheet bundle is left stacked on a stacking tray of the image forming apparatus. At this time, if there is no empty stacking tray, the image forming apparatus is not permitted to start a next print job, which results in an inefficient state of the apparatus.

To solve this problem, there have conventionally been disclosed the following techniques:

A first device configured to prevent generation of wait time due to interruption of a print job, by comparing the number of sheets that can be stacked on a sheet stacker with the number of sheets to be output in the print job and giving a warning when it is impossible to stack all the sheets to be output in the print job on the sheet stacker (see e.g. Japanese Patent Laid-Open Publication No. H09-240197); and A second device configured to prevent generation of wait time due to interruption of a print job, by adding the number of sheets to be output in a subsequent print job to the number of sheets currently stacked on a sheet stacker, to thereby obtain a total value and then comparing the total value with an upper limit of the number of sheets that can be stacked on the sheet stacker, and inhibiting the start of the subsequent print job when the total value has exceeded the upper limit (see e.g. Japanese Patent Laid-Open Publication No. H10-029755).

In the above first and second devices, when interruption of a print job is predicted at the start of the print job, a warning that the print job will be interrupted is issued in advance, or the start of the print job is inhibited. Therefore, it is impossible to start post-processing to be performed on a sheet bundle immediately after completion of printout thereof from the image forming apparatus, and consequently a wait state occurs.

DISCLOSURE OF THE INVENTION

The present invention provides an image forming apparatus, a print job processing method, and a program, which make it possible to perform image forming processing and post-processing efficiently.

In a first aspect of the present invention, there is provided an image forming apparatus comprising an image forming unit configured to form images on sheets based on an input print job, a stacker unit configured to stack a plurality of sheets which are to be carried to a post-processing apparatus that performs post-processing on sheets, the stacker unit stacking the sheets having images formed thereon by the image forming unit, and a control unit configured to determine an amount of sheets to be stacked on the stacker unit, based on per-hour processing capability of the image forming unit and per-hour processing capability of the post-processing apparatus.

In a second aspect of the present invention, there is provided an image forming apparatus comprising a stacker unit configured to stack a plurality of sheets which are to be carried to a post-processing apparatus that performs post-processing on sheets, an image forming unit configured to form images on the sheets to be stacked on the stacker unit, based on an input print job, a print job-dividing unit configured to divide an input single print job into a plurality of divided print jobs based on per-hour processing capability of the image forming unit and per-hour processing capability of the post-processing apparatus, and a control unit configured to control stacking of sheets on the stacker unit according to the divided print jobs obtained by division by the print job-dividing unit.

In a third aspect of the present invention, there is provided a print job processing method applied to an image forming apparatus including an image forming unit configured to form images on sheets based on an input print job, and a stacker unit configured to stack a plurality of sheets each having an image formed thereon by the image forming unit, the image forming apparatus being configured to perform communication with a post-processing apparatus for performing post-processing on a plurality of sheets brought from the image forming unit, the print job processing method comprising a print job dividing step of dividing an input single print job into a plurality of divided print jobs based on per-hour processing capability of the image forming unit and per-hour processing capability of the post-processing apparatus, and a control step of controlling stacking of sheets on the stacker unit according to the divided print jobs obtained by division in the print job dividing step.

Further, in a fourth aspect of the present invention, there is provided a program for causing a computer to execute the print job processing method according to the third aspect of the present invention.

According to the present invention, it is possible to divide a print job input to the image forming apparatus into a plurality of print jobs according to the processing capability of the post-processing apparatus to thereby enable the image forming apparatus and the post-processing apparatus to perform parallel processing, so that image forming processing and post-processing can be executed efficiently.

Further, a print job input to the image forming apparatus is divided such that timing in which the post-processing apparatus completes post-processing according to the first divided print job coincides with timing in which the image forming apparatus completes image forming processing in accordance with the second divided print job subsequent to the first divided print job. This enables an operator to bring sheet bundles output from the image forming apparatus to the post-processing apparatus and cause the post-processing apparatus to perform post-processing immediately. Thus, it is possible to minimize not only a time period over which sheet bundles remain in the image forming apparatus, but also a time period over which the post-processing apparatus is left unoperated, so that productivity is enhanced.

Further, the image forming apparatus and the post-processing apparatus communicate with each other via the communication unit, and the image forming apparatus divides a print job while constantly checking the processing capability and operating state of the post-processing apparatus. This enables the image forming apparatus to flexibly divide a print job even when an unexpected event, such as interruption of the operation of the post-processing apparatus, takes place, so that productivity is enhanced.

Furthermore, when the image forming apparatus is going to complete image forming processing according to the present divided print job, but when the post-processing apparatus is still performing post-processing according to the immediately preceding divided print job, the image forming apparatus prolongs the image forming processing according to the present divided print job and continues with the same. This makes it possible to prevent the operation of each of the post-processing apparatus and the image forming apparatus from being interrupted, so that productivity is enhanced.

Further, when the image forming apparatus is going to start image forming processing according to the present divided print job, but when the post-processing apparatus is still performing post-processing according to the immediately preceding divided print job, the image forming apparatus prolongs the image forming processing according to the present divided print job, in accordance with post-processing time. Thus, the image forming apparatus determines the number of copies for image formation according to the present divided print job, so that it is possible to prevent the operation of the image forming apparatus from being interrupted, to thereby enhance productivity.

Further, the image forming apparatus determines the number of copies for image formation according to the present divided print job, by taking into consideration a time period required to bring sheet bundles from the image forming apparatus to the post-processing apparatus. As a consequence, when the image forming apparatus completes the image forming processing according to the present divided print job, the operator can bring the sheet bundles to the post-processing apparatus in timing in which the post-processing apparatus completes the post-processing operation according to the immediately preceding divided print job. Therefore, productivity is markedly enhanced.

Furthermore, a time scheduled for completion of image formation output and a time scheduled for post-processing which are associated with each divided print job are displayed on the display device. Therefore, the operator can know when to bring sheet bundles to the post-processing apparatus, which enhances productivity.

What is more, a plurality of sheet bundles each having images formed on respective sheets thereof according to an associated one of a plurality of print jobs are sequentially held by a plurality of holding units such that two successive sheet bundles having undergone image forming processing are held by respective different holding units. This makes it possible to start image forming processing according to a subsequent divided print job without awaiting removal of a sheet bundle held on a holding unit, so that productivity is enhanced.

Further features and aspects of the present invention will become apparent from the following detailed description of exemplary embodiments with reference to the attached drawings.

BRIEF DESCRIPTION OF DRAWINGS

FIG. 11 is a list of processing capabilities of various kinds of off-line post-processing apparatuses connected to the image forming apparatus.

FIG. 12 is a table showing the relationship between a plurality of divided print jobs J1 to J4, a copy number i indicative of the number of copies to be printed, a printing time period Tp, a post-processing time period Tf, a printable copy number e indicative of the printable number of copies, a remaining copy number Z indicative of the remaining number of unprinted copies, and a sheet discharger.

BEST MODE OF CARRYING OUT THE INVENTION

The following description of various exemplary embodiments, features and aspects of the present invention is merely illustrative in nature and is in no way intended to limit the invention, its application, or uses.

The present invention will now be described in detail below with reference to the drawings showing preferred embodiments thereof.

Figure 1:
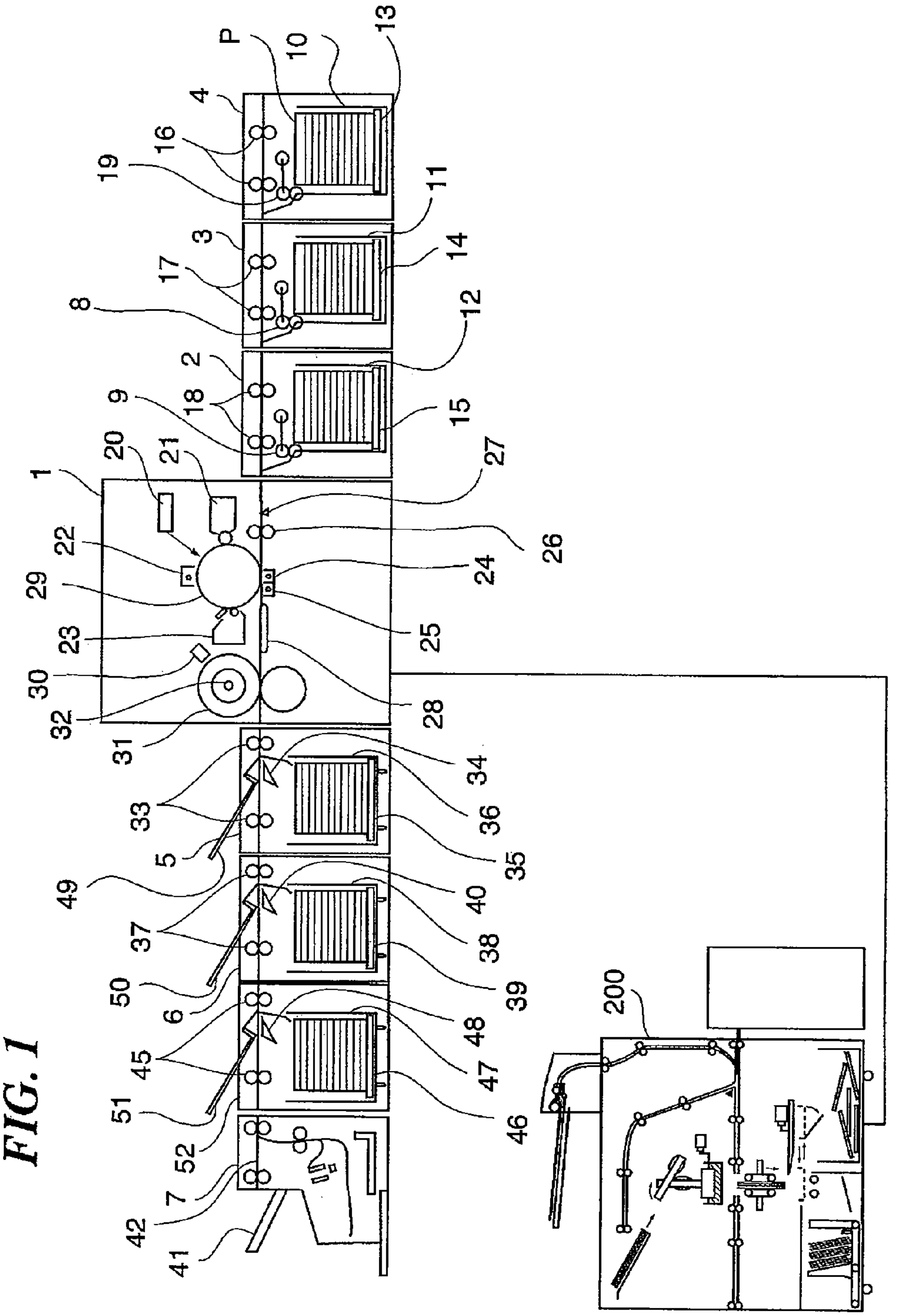
FIG. 1 is a schematic view of a printing system according to an embodiment of the present invention.

FIG. 1 is a schematic view of a printing system according to an embodiment of the present invention.

Reference numeral 1 denotes an image forming apparatus. Reference numerals 2, 3, and 4 denote respective sheet feeders for feeding sheet materials P, which are identical in construction. Reference numerals 5, 6, and 52 denote respective stackers (stacker units) on which sheets each having an image formed thereon are stacked, and reference numeral 7 denotes a finisher.

The image forming apparatus is provided with a photosensitive drum 29, and around the photosensitive drum 29, there are arranged a primary electrostatic charger 22, an exposure device 20, a developing device 21, a transfer charger 24, a separation charger 25, and a cleaner 23. The primary electrostatic charger 22 uniformly charges the photosensitive drum 29. The exposure device 20 irradiates the photosensitive drum 29 with an optical signal converted from image data. The developing device 21 converts a latent image formed on the photosensitive drum 29 by the exposure device 20 into a visible image, using toner. The transfer charger 24 transfers the toner image formed on the photosensitive drum 29 onto a sheet material P. The separation charger 25 outputs high voltage for separating the sheet material P from the photosensitive drum. The cleaner 23 collects toner remaining on the photosensitive drum 29 without being transferred.

The sheet feeders 2, 3, and 4 are comprised of respective storage cassettes 12, 11, and 10, respective sheet feed rollers 9, 8, 19, respective lifters 15, 14, and 13, and respective conveying rollers 18, 17, and 16. Each of the storage cassettes 12, 11, and 10 stores stacked sheet materials P. Each of the sheet feed rollers 9, 8, 19 feeds the sheet materials P one by one from an associated one of the storage cassettes 12, 11, and 10. Each of the lifters 15, 14, and 13 adjusts the height of the sheet materials P in the associated one of the storage cassettes 12, 11, and 10 to a position suitable for sheet feeding. The conveying rollers 18, 17, and 16 convey sheet materials P.

Further, each of the sheet feeders 2, 3, and 4 has a heater, not shown, and a blower, not shown, for delivering air warmed by the heater into the associated one of the storage cassettes 12, 11, and 10, whereby humidity in each of the storage cassettes 12, 11, and 10 is adjusted. It should be noted that whether or not the humidity adjustment control should be performed is determined depending on the quality of a sheet material P. For example, when plain sheets with a basis weight of approximately 64 $g/m^2$ to 105 $g/m^2$ are used, the humidity adjustment control is not performed, whereas when thick sheets with a basis weight exceeding 105 $g/m^2$ are used, the humidity adjustment control is performed.

Further, before the temperature of the heater reaches a predetermined temperature, the associated sheet feeder 2, 3, or 4 is not permitted to start feeding sheet materials P. For this reason, a time period from a time point when the power is turned on or when an instruction for starting a conveying operation to a time point when the conveying operation is enabled varies according to parameters, such as the quality of sheet materials P stacked on the sheet feeder 2, 3, or 4.

In the image forming apparatus 1, a sheet material P fed from one of the sheet feeders 2, 3, and 4 is detected by a sheet material detecting sensor 27, and brought into abutment with a registration roller 26, whereby the skew of the sheet material P is corrected. Then, the sheet material P is conveyed to the transfer charger 24, and a toner image is transferred onto the sheet material P by the transfer charger 24. Thereafter, the sheet material P is conveyed to a fixing roller 31 by a conveyor belt 28.

The fixing roller 31 is comprised of a pair of rollers, and the upper roller incorporates a halogen heater 32. A thermistor 30 is disposed close to the upper roller to detect the temperature of the fixing roller 31. The fixing roller 31 is held at a temperature of approximately 180° C. by the halogen heater 32. A sheet material P having passed through the fixing roller 31 is conveyed to a stacker 5.

The stacker 5 and stackers 6 and 52 have respective storage cassettes 36, 38, and 47 for receiving sheet materials P. Further, the stackers 5, 6, and 52 have respective stacking trays 35, 39, and 46 each functioning as a storage unit, respective conveying rollers 33, 37, and 45, respective sample trays 49, 50, and 51, and respective flappers 34, 40, and 48. On each of the stacking trays 35, 39, and 46 in the respective storage cassettes 36, 38, and 47, 5000 sheet materials P can be stacked at the maximum. The conveying rollers 33, 37, and 45 convey sheet materials P. Each of the sample trays 49, 50, and 51 is configured such that several hundreds of sheet materials P can be stacked thereon. Each of the flappers 34, 40, and 48 switches one conveying path to another for conveying a sheet material P. As conveying paths, each of the stackers has a path for stacking sheet materials P in an associated one of the storage cassettes 36, 38, and 47, a path for conveying a sheet material P to a downstream apparatus, and a path for stacking sheet materials P onto an associated one of the sample trays 49, 50, and 51.

A finisher 7 is provided with a sheet discharge tray 41 on which sheet materials P are stacked. Sheet materials P are stacked on the sheet discharge tray 41 via a conveying path 42. It should be noted that the image forming apparatus 1 has an operating section (which will be described hereinafter with reference to FIG. 4), not shown.

Reference numeral 200 denotes a case binding machine. The case binding machine 200 is a post-processing apparatus which operates off-line. The case binding machine 200 is electrically connected to the image forming apparatus 1 via a network, and the image forming apparatus 1 can obtain information concerning the operating state and processing capability of the case binding machine 200 through communication with the case binding machine 200. The case binding machine 200 is not mechanically connected to the image forming apparatus 1. This means that there is no conveying path for directly conveying sheets discharged from the image forming apparatus 1 into each of the stackers 5, 6, and 52 to the case binding machine 200. An operator (human operator) brings a sheet bundle stacked on the stacking tray 35, 39, or 46 or the sample tray 49, 50, or 51 of the stacker 5, 6, or 52, or on the sheet discharge tray 41 of the finisher 7 to the case binding machine 200 and sets the same on a sheet feeder (denoted by reference numeral 201 in FIG. 3), followed by starting the case binding machine 200.

Figure 2A:
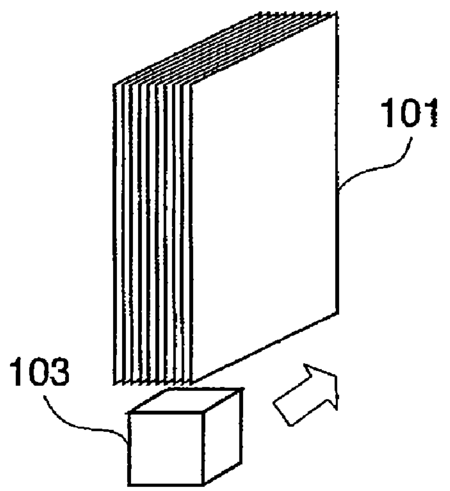
FIGS. 2A to 2C are views showing a form of a booklet produced by a case binding machine.
Figure 2B:
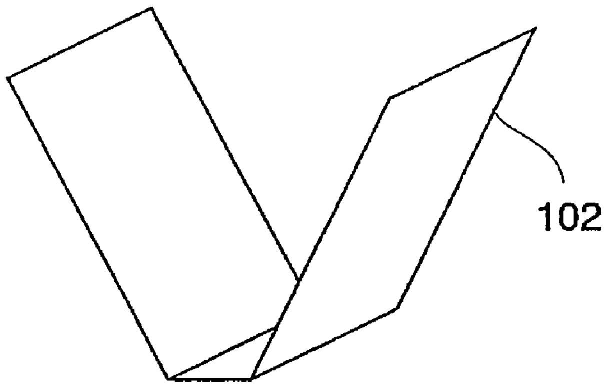
Figure 2C:
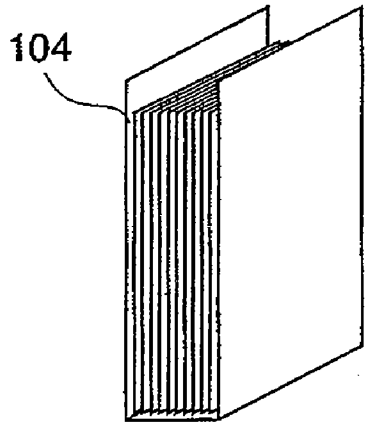

FIGS. 2A to 2C are views showing a form of a booklet produced by the case binding machine 200.

In case binding, a gluing unit 103 applies glue to one side of a sheet bundle 101 having undergone image forming processing (FIG. 2A), and then the sheet bundle 101 is covered by a cover sheet 102 in a wrapped manner (FIG. 2B), whereby the sheet 102 is held in intimate contact with the glue-applied surface of the sheet bundle 101. Thus, a booklet 104 having a cover is produced (FIG. 2C). Glue for bonding the sheet 102 to the sheet bundle 101 is solid at room temperature, and hence it is required to be heated by a heater or the like before gluing processing. Therefore, it takes several minutes before the gluing processing can be started.

Figure 3:
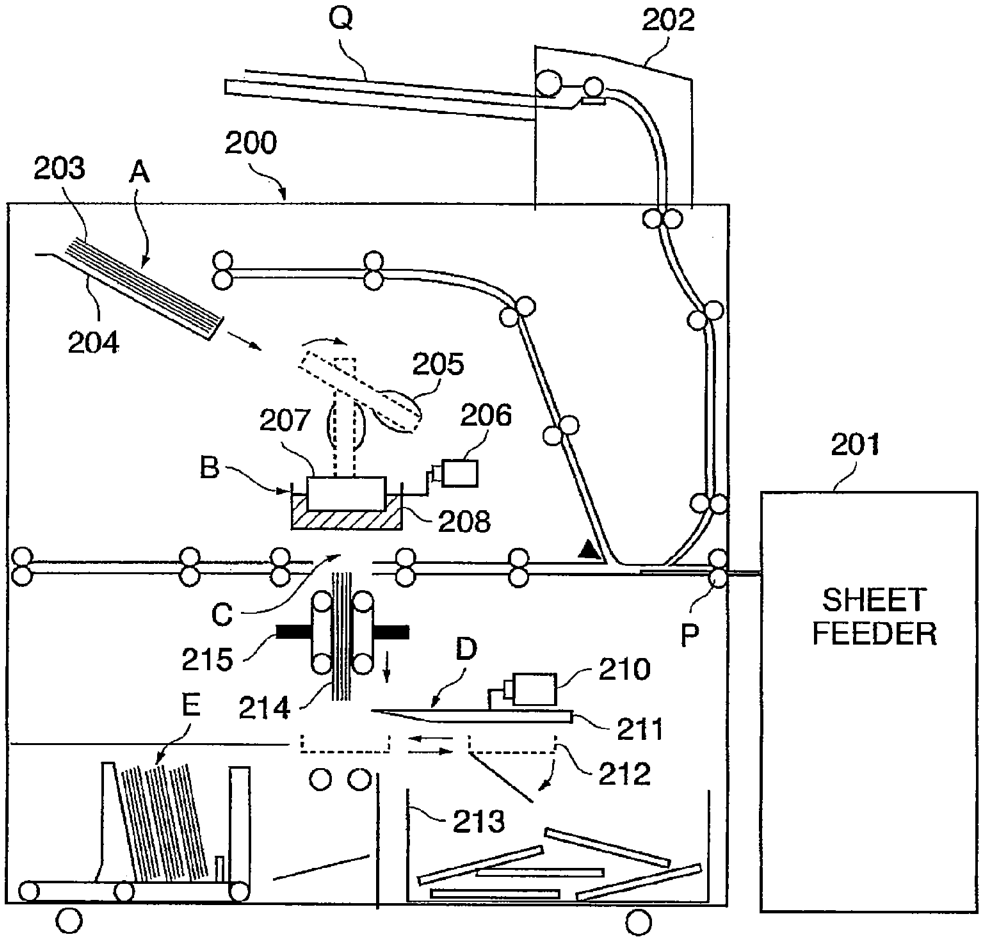
FIG. 3 is a cross-sectional view showing the internal construction of the case binding machine.

FIG. 3 is a cross-sectional view showing the internal construction of the case binding machine 200.

The case binding machine 200 is comprised of a sheet stacking section A, a glue applying section B, a bonding section C, a cutting section D, and a booklet discharge section E. The sheet stacking section A stacks sheet materials P (recording sheets) fed from the sheet feeder 201 to thereby form a sheet bundle 203. The glue applying section B applies glue to the sheet bundle 203 stacked on the sheet stacking section A. The bonding section C bonds the glue-applied sheet bundle 203 to a cover Q fed from a cover sheet feeder 202. The cutting section D performs edge-cutting on three end surfaces of the sheet bundle 203 other than the glue-applied end surface of the same so as to bookbind the sheet bundle 203 having the cover Q bonded thereto. A booklet completed by bookbinding the sheet bundle 203 is discharged into the booklet discharge section E.

Next, a description will be given of a sequence of operations performed by the case binding machine 200.

The sheet feeder 201 feeds, one by one, the sheets of a sheet bundle brought by the operator from the image forming apparatus 1 and stored in the sheet feeder 201. The sheet stacking section A stacks recording sheets fed from the sheet feeder 201 in a bookbinding mode on a stacking tray 204 to form a sheet bundle 203. The sheet bundle 203 formed by the sheet stacking section A is moved to the glue applying section B in a state gripped by a gluing gripper 205, and glue is applied to the lower end surface of the sheet bundle 203 by a glue container 208, a glue-applying roller 207, and a glue-applying roller drive motor 206. In the bonding section C, the glue-applied sheet bundle 203 is bonded to a cover Q fed from the cover sheet feeder 202, and a booklet 214 formed by bonding the sheet bundle 203 to the cover Q is gripped by a trim gripper 215.

Then, the booklet 214 is conveyed to the cutting section D by the trim gripper 215. In the cutting section D, a cutter 211 is horizontally moved by a cutter drive motor 210 to cut the booklet 214. Cut-off chips cut off from the booklet 214 fall into a chip receiving box 212. When the sequence of cutting operations is completed, the chip receiving box 212 is moved to a position above a chip waste box 213 to drop the cut-off chips into the chip waste box 213. Thus, the cut-off chips are collected.

The booklet 214 having undergone the cutting processing in the cutting section D is conveyed from the cutting section D to the booklet discharge section E to be discharged therein.

The case binding machine 200 carries out the sequence of bookbinding operations as above.

The image forming apparatus 1 is provided with the operating section 60. Now, the operating section 60 will be described with reference to FIG. 4.

Figure 4:
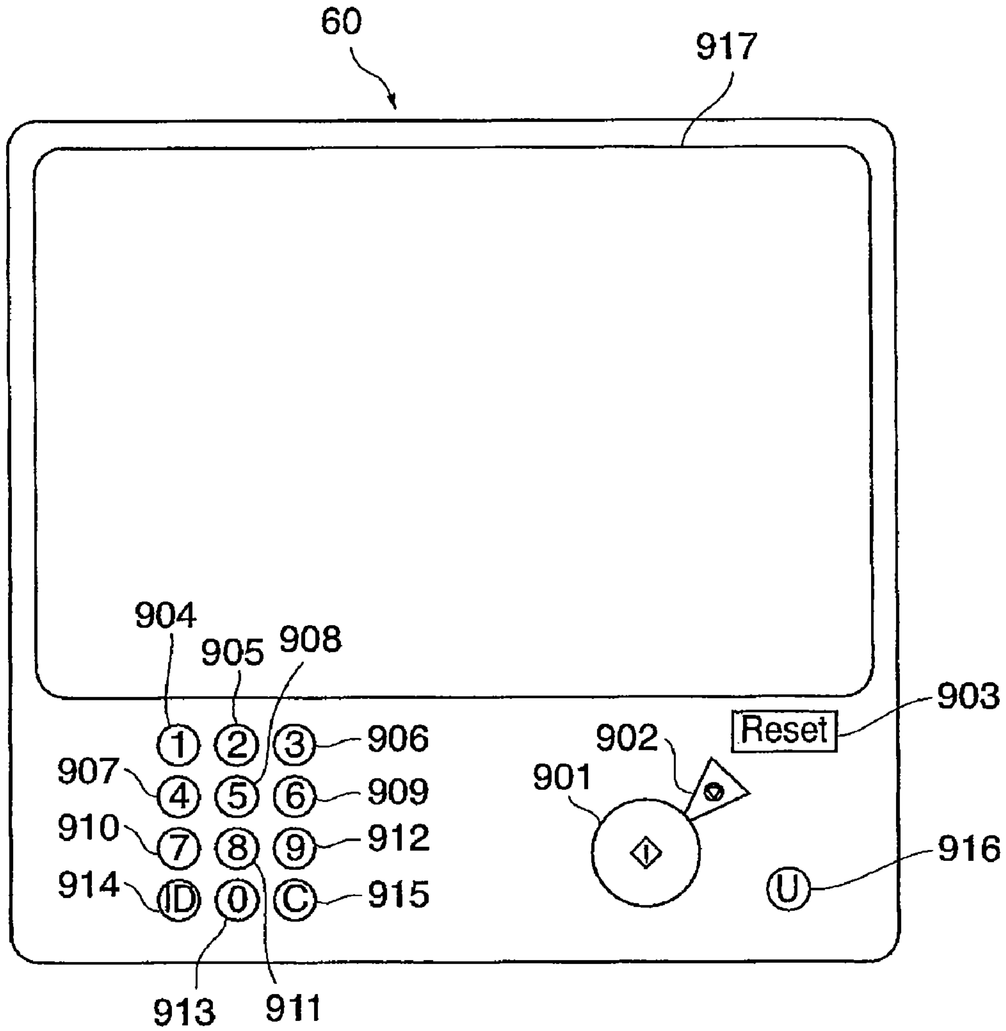
FIG. 4 is a view showing the appearance of an operating section provided in an image forming apparatus.

FIG. 4 is a view showing the appearance of the operating section 60 provided in the image forming apparatus 1.

In the operating section 60, there are arranged a start key 901 for starting image forming processing, a stop key 902 for interrupting the image forming operation, a reset key 903 for returning a display or a setting to an initial state, a ten-key numeric keypad including keys 904 to 913 for setting input numbers, an ID key 914, a clear key 915, a user mode key 916, and so forth.

Figure 5:
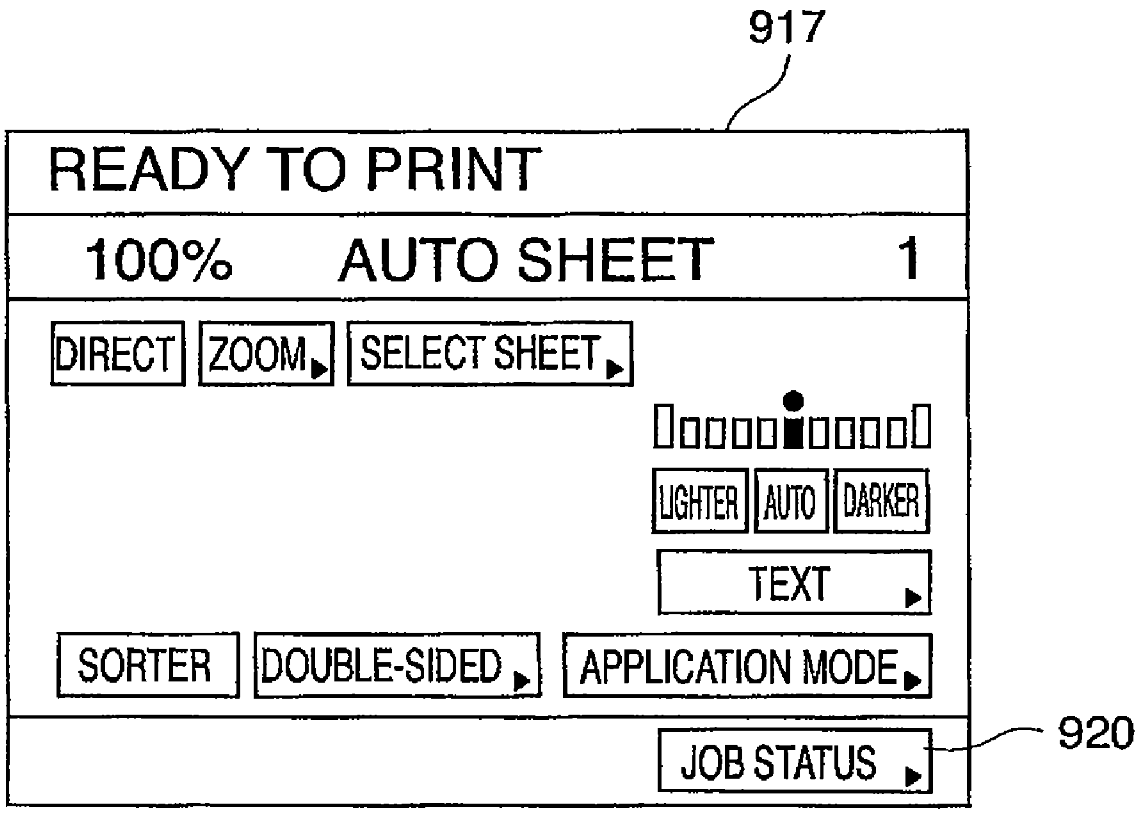
FIG. 5 is a view of a standard screen displayed on a liquid crystal display screen of a liquid crystal display section.

Further, the operating section 60 includes a liquid crystal display section 917 having a touch panel provided on the top thereof, and soft keys can be provided on a liquid crystal display screen of the liquid crystal display section 917. Normally, a default configuration screen (standard screen) shown in FIG. 5 by way of example is displayed on the liquid crystal display section 917. A user configures settings for an image forming operation via the standard screen. The bookbinding mode can also be configured by operating soft keys displayed on the liquid crystal display section 917. FIG. 5 is a view of the standard screen displayed on the liquid crystal display screen of the liquid crystal display section 917.

Next, a controller for controlling the operation of the present printing system will be described with reference to FIG. 6.

Figure 6:
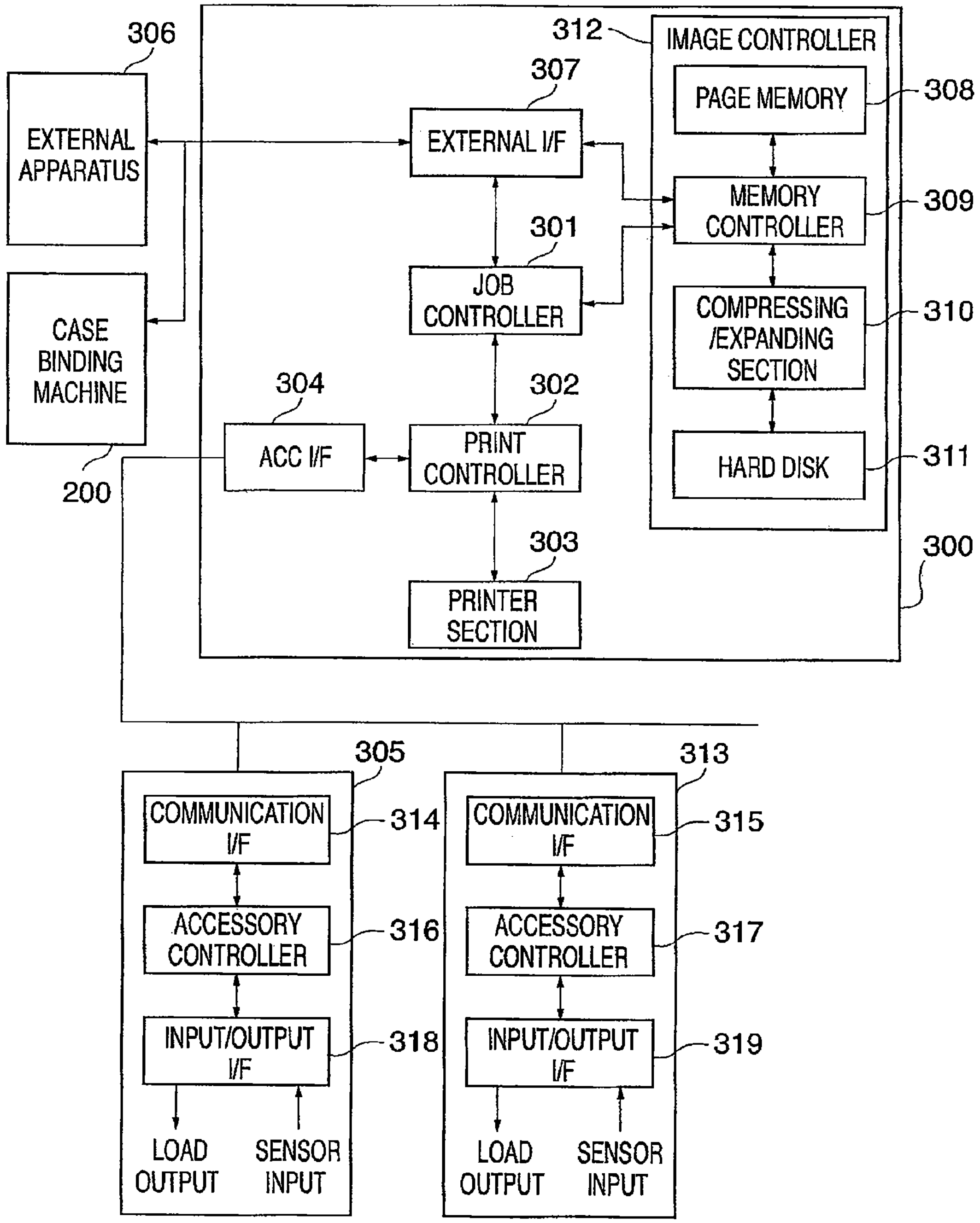
FIG. 6 is a block diagram of a controller for controlling the operation of the printing system shown in FIG. 1.

FIG. 6 is a block diagram of the controller 300 for controlling the operation of the printing system shown in FIG. 1.

Reference numeral 306 denotes an external apparatus, such as a personal computer (PC) or an image reading apparatus, which transmits a print job to the image forming apparatus 1. The print job is comprised of image data and print data. The print data is comprised of information required to perform printing, such as information indicative of which device is to supply sheet materials on each of which an associated image is to be printed, information indicative of which device printed sheet materials are to be discharged into, and information indicative of which post-processing apparatus is to execute post-processing on the printed sheet materials, and information indicative of the end of a job. Further, the print data includes data of the number of copies for image printing.

A print job transmitted from the external apparatus 306 is sent to an external interface (print job receiving unit, communication unit) 307 (print job receiving step) of the controller 300 of the image forming apparatus 1. The print job received by the external interface 307 is sent to a memory controller 309.

The memory controller 309 extracts compressed image data from the received print job and sends the extracted image data to a compressing/expanding section 310. The compressing/expanding section 310 expands the received image data to thereby convert the same into data to be processed by a job controller 301 (print job-dividing unit, operation control unit, processing capability collecting unit, operating state-detecting unit) described hereinafter, a print controller 302 (image forming unit) also described hereinafter, and so forth. The converted image data is stored in a hard disk 311. It should be noted that another large-capacity storage unit may be used in place of the hard disk 311.

On the other hand, the memory controller 309 extracts print data from the received print job and sends the extracted print data to the job controller 301. Upon reception of the print data, the job controller 301 acquires data indicative of the operating state and processing capability of the case binding machine 200 via the external interface 307 and determines whether or not to divide one print job into a plurality of print parts and how to divide the print job. It should be noted that "print part" is referred to as "divided print job". Then, the job controller 301 transmits an operation start command for starting a printing operation to the print controller 302.

It should be noted that the job controller 301 has a memory, not shown, for storing information concerning job division.

Upon reception of the operation start command from the job controller 301, the print controller 302 transfers the operation start command to a printer section (image forming unit) 303. At the same time, the print controller 302 transfers the operation start command to a sheet feeder controller 305 and a sheet discharger controller (stack unit) 313, both of which are used in the print job, via an accessory (ACC) interface 304.

The sheet feeder controller 305 corresponds to a control section for controlling the operation of each of the sheet feeders 2, 3, and 4 appearing in FIG. 1, and the sheet discharger controller 313 corresponds to a control section for controlling the operation of each of the stackers 5, 6, and 52 and the finisher 7 appearing in FIG. 1.

The sheet feeder controller 305 and the sheet discharger controller 313 have different control targets, but have the same construction as controllers. More specifically, the sheet feeder controller 305 and the sheet discharger controller 313 are comprised of respective communication interfaces 314 and 315, respective input/output interfaces 318 and 319, and respective accessory controllers 316 and 318. The communication interfaces 314 and 315 each provide interface with the image forming apparatus 1 for transmitting and receiving commands, including the operation start command. The input/output interfaces 318 and 319 each provide interface for driving loads, such as motors, or receiving sensor signals. The accessory controllers 316 and 317 each communicate with the image forming apparatus 1 or an adjacent apparatus to control loads and perform control of conveyance of sheet materials and post-processing.

On the other hand, the printer section 303 is a component of the image forming apparatus 1, for forming an image on a sheet material.

When preparation for starting the respective operations of the printer section 303, the sheet feeder controller 305, and the sheet discharger controller 313 is completed, the job controller 301 requests the memory controller 309 to acquire page-by-page image data. Upon reception of this request, the memory controller 309 reads out compressed image data from the hard disk 311 and expands the image data into bitmap data by the compressing/expanding section 310, to store the bitmap data in a page memory 308. The page memory, the memory controller 309, the compressing/expanding section 310, and the hard disk 311 form an image controller 312.

The memory controller 309 reads out the bitmap data from the page memory 308 and sends the same to the job controller 301. The job controller 301 transfers the received bitmap data to the printer section 303 via the print controller 302.

The print controller 302 not only instructs the printer section 303 to perform image forming processing, but also instructs the sheet feeder controller 305 to start conveyance of a sheet material, and transmits information on the sheet material to the sheet discharger controller 313 via the ACC interface 304 according to a conveying path for conveying the sheet material.

Further, when the print job is completed, the job controller 301 instructs the print controller 302 to terminate its operation. The print controller 302 instructs each of the sheet feeder controller 305 and the sheet discharger controller 313 to terminate its operation, as required, via the ACC interface 304, as well as instructs the printer section 303 to terminate its operation. It should be noted that when subsequent print jobs arrive from the external apparatus 306 during execution of a print job by the print controller 302, image data is stored in the hard disk 311 via the memory controller 309. Further, the job controller 301 stores print data. Then, when the preceding print job is completed, the subsequent print jobs are sequentially executed.

Next, division and execution of a print job will be described with reference to FIG. 7.

Figure 7:
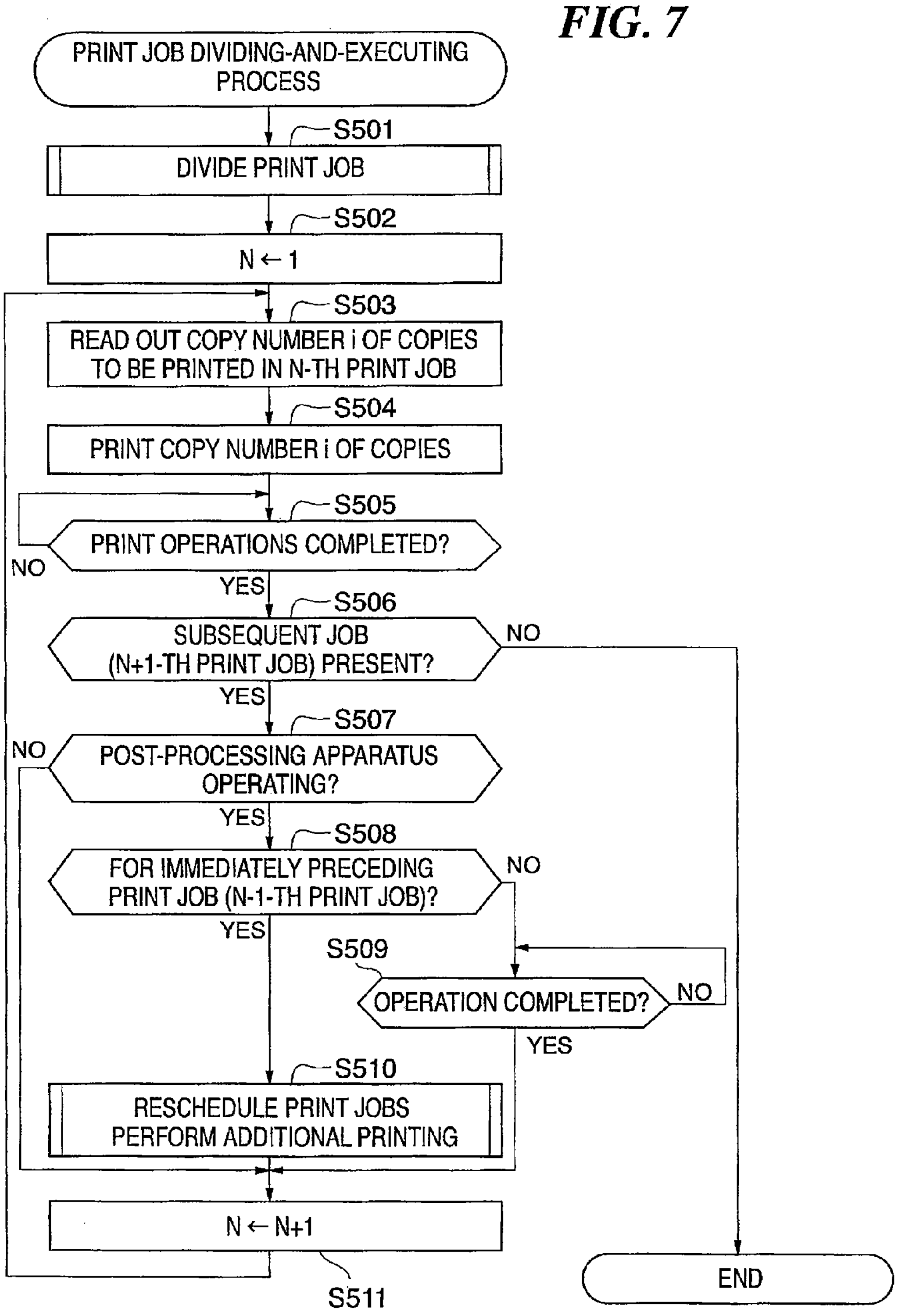
FIG. 7 is a flowchart of a print job dividing-and-executing process executed by the controller of the printing system.

FIG. 7 is a flowchart of a print job dividing-and-executing process (print job processing method) executed by the controller 300 of the printing system. This process is started when a print job is input from the external apparatus 306.

First, in a step S501 (print job-dividing step), the controller 300 divides the print job. In the step S501, though this dividing process will be described in detail hereinafter with reference to FIG. 8, the controller 300 determines a divided print job number J indicative of the number of divisions of the print job (number of divided print jobs) and a copy number i indicative of the number of copies to be printed in each of the divided print jobs (the copy number i is set on a print job-by-print job basis). It should be noted that the divided print jobs are arranged and sequentially numbered. A variable indicating the order of each divided print job is represented by N. The divided print job number J and the copy number i determined in the step S501 are stored on a print job-by-print job basis in the memory (not shown) provided in the job controller 301 appearing in FIG. 6.

In the following step S502, the controller 300 initializes the variable N indicating the order of each divided print job to 1.

In a step S503, the controller 300 reads out the copy number i of copies to be printed in an N-th print job from the memory of the job controller 301.

In a step S504, the controller 300 starts a printing operation to be performed a number of times corresponding to the copy number read out in the step S503, and then the process proceeds to a step S505.

In the step S505, the controller 300 awaits completion of the printing operation, and when the printing operation is completed (YES to S505), the process proceeds to a step S506.

In the step S506, the controller 300 refers to the memory of the job controller 301 and checks whether or not there is a subsequent job (N+1-th print job). If there is no subsequent job, the present process is terminated, whereas if there is a subsequent job, the process proceeds to a step S507.

In the step S507, the controller 300 inquires of an off-line post-processing apparatus, such as the case binding machine 200, as to the operating state of the post-processing apparatus via the external interface 307. If the post-processing apparatus is operating, the process proceeds to a step S508. On the other hand, if the post-processing apparatus is not operating, it is judged that the subsequent print job (N+1-th print job) can be executed, and the process proceeds to a step S511.

In the step S508, the controller 300 further inquires of the off-line post-processing apparatus via the external interface 307 whether or not the post-processing under execution is for the immediately preceding print job (N−1-th print job). If the post-processing under execution is for the immediately preceding print job, the process proceeds to a step S510. On the other hand, if the post-processing under execution is not for the immediately preceding print job, it is judged that another print job, such as an interrupt print job, is under execution, and the process proceeds to a step S509. It should be noted that determination as to whether or not the post-processing under execution is for the immediately preceding print job is performed e.g. by a method in which an operator enters the ID of a print job to be subjected to post-processing, via the operating section of the off-line post-processing apparatus, and the off-line post-processing apparatus transmits the entered ID to the image forming apparatus 1.

In the step S509, the controller 300 waits until the operation of the off-line post-processing apparatus is once terminated.

In the step S510, the post-processing has not been completed as scheduled. Therefore, the controller 300 re-checks the copy number i in each of the divided print jobs, reschedules print jobs yet to be executed, and determines the number of copies to be additionally printed, followed by performing the additional printing. After completion of the additional printing, the process proceeds to a step S511. The rescheduling and the additional printing will be described in detail hereinafter with reference to FIG. 9.

In the step S511, the controller 300 increments the variable N by 1, and then the process returns to the step S503 so as to execute the subsequent divided print job.

Although not shown in FIG. 7, the controller 300 repeatedly carries out the steps S503 to S511 a number of times corresponding to the divided print job number J (until the variable N becomes equal to the divided print job number J) to thereby execute all the divided print jobs (operation control step).

Although in the step S505, the end of a printing operation is awaited, this is not limitative, but the flow may be changed such that the start of a printing operation is awaited, and when the printing operation is started (YES to S505), the process proceeds to the step S506.

Figure 8A:
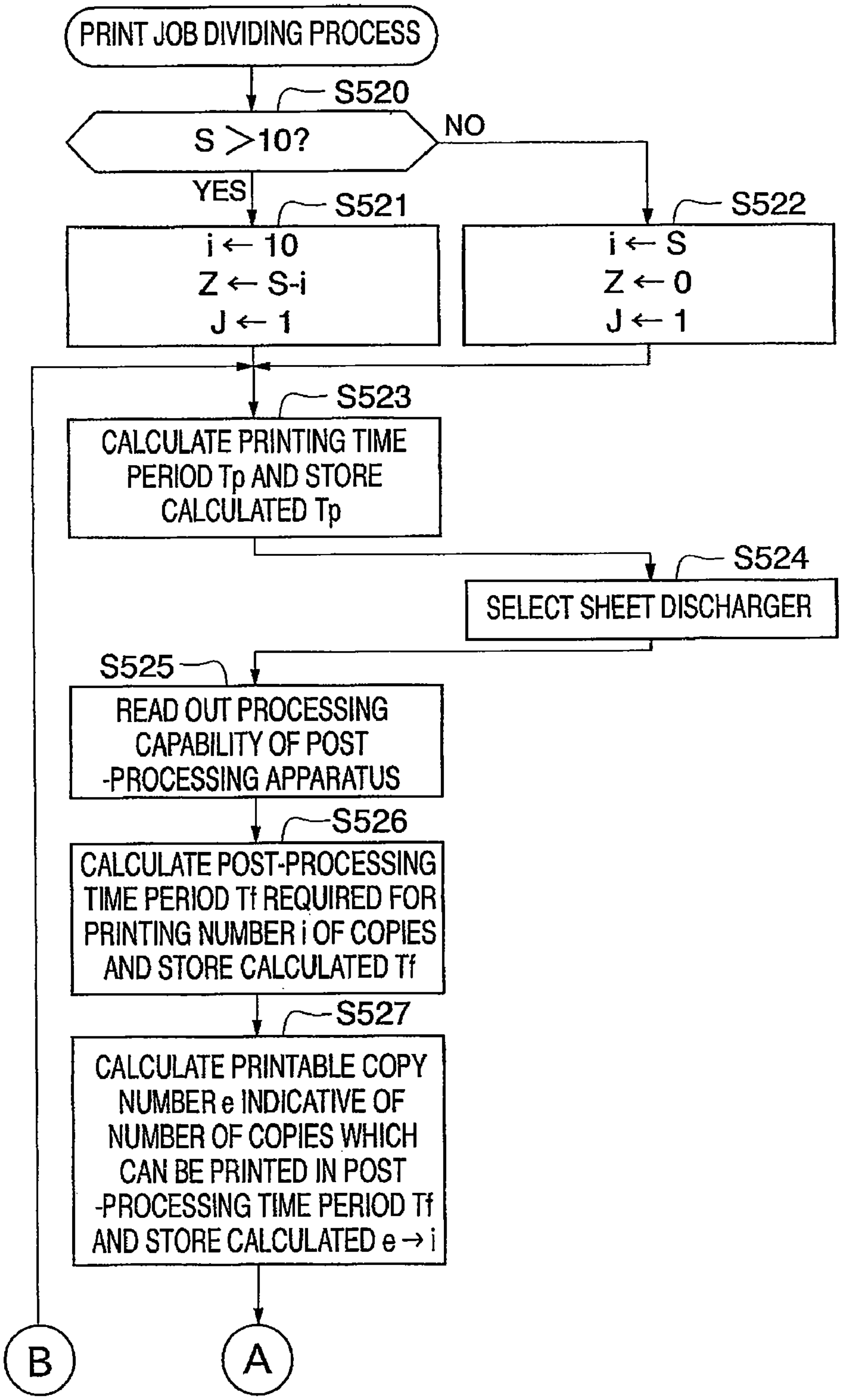
FIGS. 8A and 8B are flowcharts of a print job dividing process executed in a step S501 in FIG. 7.
Figure 8B:
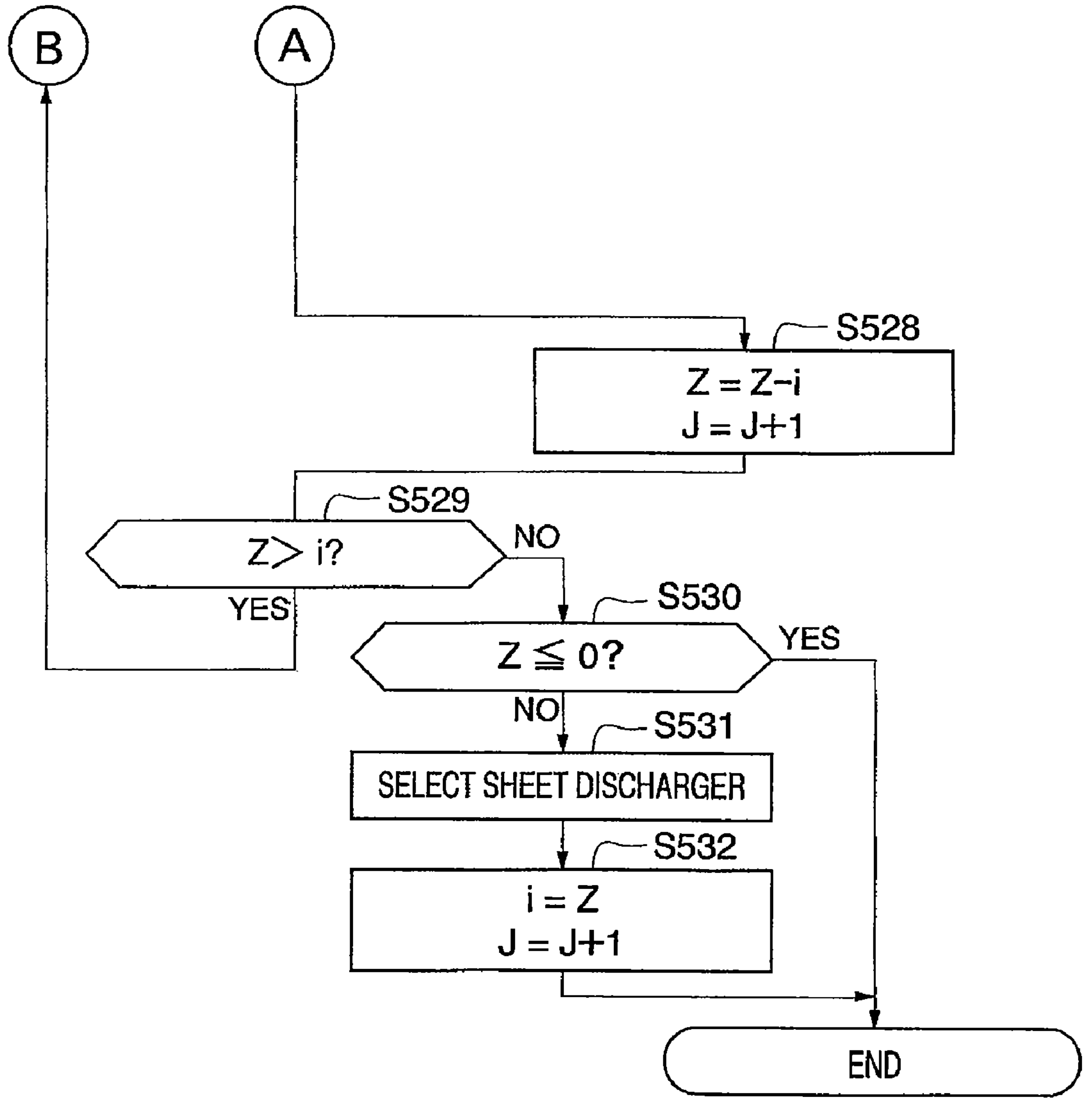

FIG. 8 is a flowchart of the print job dividing process executed in the step S501 in FIG. 7.

Now, a number (total copy number) of copies to be printed by a print job before job division is represented by S, a remaining copy number Z indicative of the remaining number of unprinted copies included in the total copy number S by Z, and a print copy number associated with each of a plurality of divided print jobs, which is set for printing, by i. These numerical values are stored in the memory of the job controller 301 in association with each split job Jn (i.e. as configuration data of each split job Jn) in a step S527, referred to hereinafter.

First, in a step S520, the controller 300 checks whether or not the print copy number S (total copy number) associated with the print job before job division is larger than a predetermined value (e.g. 10). It should be noted that when the total copy number S is larger than the predetermined value, the associated print job is divided. If the total copy number S is larger than the predetermined value, the process proceeds to a step S521, whereas if the total copy number S is not larger than the predetermined value, the process proceeds to a step S522.

In the step S521, the controller 300 sets the print copy number i associated with a divided print job to be set in the present loop to a predetermined value (e.g. 10), the remaining copy number Z to a numerical value obtained by subtracting the print copy number i from the total copy number S, and sets the divided print job number J to 1, followed by the process proceeding to a step S523.

On the other hand, in the step S522, the controller 300 sets the print copy number i associated with the divided print job to be set in the present loop to the total copy number S, the remaining copy number Z to 0, and the divided print job number J to 1, and then the process proceeds to the step S523.

In the step S523, the controller 300 calculates a printing time period Tp which it takes to print the print copy number i of copies according to the divided print job set in the present loop, and stores the calculated printing time period Tp in the memory of the job controller 301. The printing time period Tp varies according to the size of a sheet to be printed and an operation mode, such as the double-sided printing mode or the single-sided printing mode. For example, it is assumed that a printing speed in a case where the image forming apparatus 1 performs single-sided printing is set to 100 ppm (i.e. a speed at which 100 single-sided pages can be printed per minute). When the image forming apparatus 1 performs double-sided printing of the print copy number i (i=10) of copies each formed of 50 sheets, according to the divided print job set in the present loop, the printing time period Tp becomes equal to 10 minutes (=(50 sheets×2 (double sides)×10 bundles/100 ppm).

In the following step S524, the controller 300 selects a sheet discharger in which printed sheets are to be stacked, from the stackers 5, 6, and 52. In this selection, a stacker having no sheets stacked therein is selected, for example.

In a step S525, the controller 300 checks the processing capability (the number of copies, i.e. sheet bundles that can be post-processed per minute) of the off-line post-processing apparatus to be used. The processing capability of the off-line post-processing apparatus can be checked e.g. by the following three methods:

(1) Data of the processing capability of each post-processing apparatus, which is shown in FIG. 11 by way of example, is stored in advance in the hard disk 311 or the like, and the controllers 300 reads out data of the post-processing apparatus to be used.

(2) The controller 300 inquires, via the external interface 307, of a post-processing apparatus (case binding machine 200) as to the processing capability thereof e.g. when the image forming apparatus 1 is turned on, and stores data received from the post-processing apparatus in the hard disk 311 or the like. The controller 300 reads out this data.

(3) An operator inputs the processing capability of a post-processing apparatus via the operating section 60 e.g. when the post-processing apparatus is installed. The input values are stored in the hard disk 311 or the like, and the controllers 300 reads out the input values.

In a step S526, the controller 300 calculates a post-processing time period Tf which it takes to perform post-processing of the print copy number i (i=10) of copies according to the divided print job set in the present loop, based on the processing capability of the off-line post-processing apparatus checked in the step S525, and stores the calculated post-processing time period Tf in the memory of the job controller 301.

For example, an off-line post-processing apparatus 1 appearing in FIG. 11 has processing capability of 0.5 bundle/minute, and therefore the post-processing time period Tf which it takes to perform post-processing of the print copy number i (i=10) of copies according to the divided print job set in the present loop is 20 minutes (=$^{10}/_{0.5}$). FIG. 11 is a list of the processing capabilities of various kinds of off-line post-processing apparatuses connected to the image forming apparatus 1.

In the step S527, the controller 300 calculates a printable copy number e indicative of the printable number of copies which can be printed assuming that print processing is executed according to a subsequent divided print job over the post-processing time period Tf calculated in the step S526. Then, the controller 300 stores the calculated printable copy number e as configuration data associated with the split job Jn in the memory of the job controller 301 together with the remaining copy number Z, the print copy number i, the printing time period Tp, and the post-processing time period Tf set/calculated in the preceding steps as described above, and sets the print copy number i associated with the subsequent divided print job J(n+1) to this printable copy number e.

In the case of calculating the printable copy number e, a time period Th required for the operator to take out a sheet bundle discharged in one of the stackers 5, 6, and 52 and bring the same to an off-line post-processing apparatus may be taken into consideration in addition to the printing speed and operation mode of the image forming apparatus 1. In this case, the printable copy number e becomes equal to the number of copies can be printed by print processing according to the subsequent divided print job before a time period (Tf-Th) elapses.

In the following step S528, the controller 300 sets a value obtained by subtracting the print copy number i associated with the next divided print job from the remaining copy number Z, as a new remaining copy number Z, and then increments the divided print job number J by 1 (J=J+1), followed by the process proceeding to a step S529.

In the step S529, the controller 300 performs comparison between the remaining copy number Z and the copy number i of copies to be printed (=printable copy number e). If the remaining copy number Z is larger than the copy number i of copies to be printed, the process returns to the step S523, whereas if the remaining copy number Z is not larger than the copy number i of copies to printed, the process proceeds to a step S530.

In the step S530, the controller 300 checks whether the remaining copy number Z is not larger than 0. If the remaining copy number Z is not larger than 0, the present dividing process is terminated. If the remaining copy number Z is larger than 0, the process proceeds to a step S531, wherein a sheet discharger is selected. Thereafter, the process proceeds to a step S532.

In the step S532, the controller 300 sets the remaining copy number Z to the copy number i of copies to printed in accordance with a second subsequent divided print job, and then increments the divided print job number J by 1 (J=J+1) and stores these values in association with the divided print job number, followed by terminating the present process.

An example of print job division performed based on the dividing process in FIG. 8 will be described with reference to FIG. 12. FIG. 12 is a table showing the relationship between a plurality of divided print jobs J1 to J4, the print target copy number i, the printing time period Tp, the post-processing time period Tf, the printable copy number e, the remaining copy number Z, and each sheet discharger.

It is assumed that in a print job before job division in this example, double-sided printing of an amount corresponding to 150 copies each formed of 50 sheets is performed, to produce 150 booklets by post-processing. Further, the image forming apparatus has a printing capability of 100 ppm (50 sheets/minute in the double-sided printing mode), and one copy of 50 sheets can be printed by double-sided printing in one minute (1 minute/copy). The post-processing apparatus has a processing capability of 0.5 booklet/minute (=2 minutes/copy). Furthermore, the predetermined value (step S520 in FIG. 8) as a reference for determination as to whether or not to divide a print job is set to e.g. 10.

First, in a first print job J1 of a plurality of divided print jobs, which is to be processed for the first time, the step S521 in FIG. 8 is executed, whereby the print copy number i associated with the divided print job to be set in the present loop is set to 10.

The printing time period Tp associated with the first print job J1 is set to 10 minutes (=10 copies×1 minute/copy), and the post-processing time period Tf to 20 minutes (=10 copies ×2 minute/copy). By setting the post-processing time period Tf to 20 minutes, the printable copy number e associated with a subsequence print job J2 is set to 20 copies (=20 minutes/1 minute/copy).

The stacker 5 is selected as a sheet bundle discharge destination in the first print job J1.

The remaining copy number Z associated with the first print job J1 is set to 140 copies (=150 copies−10 copies).

Since the printable copy number e associated with the second print job J2 is set to 20 copies as described above, the print target copy number i associated with the second print job J2 is set to 20 copies. Thus, the copy number i of copies to printed according to an n-th print job is determined by the printable copy number e associated with the n-th print job determined based on the printing time period Tp associated with the (n−1)-th print job.

Since the copy number i of copies to printed (=printable copy number e) is set to 20 copies, the printing time period Tp associated with the second print job J2 is set to 20 minutes (=20 copies×1 minute/copy). For the same reason, the post-processing time period Tf is set to 40 minute (=20 copies×2 minutes/copy). As a consequence, the printable copy number e associated with a subsequent print job J3 is set to 40 copies (=40 minutes/1 minute/copy).

The stacker 6 is selected as a sheet bundle discharge destination in the second print job J2. More specifically, the amount of sheet bundles to be stacked on the stacker 6 is set to 20 bundles. The set amount corresponds to the amount of sheets to be brought from the stacker 6 to the post-processing apparatus 200 by one-time carrying work.

Then, the remaining copy number Z associated with the second print job J2 is set to 120 copies (=140 copies−20 copies).

Even after completion of the second print job J2, remaining copy number Z>copy number i of copies to printed still holds (YES to the step S527 in FIG. 8), and therefore the process proceeds to configuration of a subsequent split job.

Since the print target copy number i (=printable copy number e) is set to 40 copies, the printing time period Tp associated with the third print job J3 is set to 40 minutes (=40 copies ×1 minute/copy). For the same reason, the post-processing time period Tf is set to 80 minutes (=40 copies×2 minutes/ copy). As a consequence, the printable copy number e associated with a subsequent print job J4 is set to 80 copies (=80 minutes/1 minute/copy).

The stacker 5 is selected again as a sheet bundle discharge destination in the third print job J3. This is because the stacker 5 has been empty after the sheet bundle for the first print job J1 was taken out to be subjected to the post-processing. More specifically, the amount of sheet bundles to be stacked on the stacker 5 is set to 40 bundles.

Then, the remaining copy number Z associated with the third print job J3 is set to 80 bundles (=120 copies−40 copies).

After completion of the third print job J3, the remaining copy number Z becomes equal to 80 copies, and the printable copy number e (=copy number i of copies to printed) also becomes equal to 80 copies. Therefore, remaining copy number Z=copy number i of copies to printed (=printable copy number e) holds. Consequently, the process proceeds from the step S527 in FIG. 8 to the step S530, wherein the copy number i of copies to printed in accordance with a subsequent print job is set to the remaining copy number Z.

Since the print target copy number i is set to 80 copies, the printing time period Tp associated with the fourth print job J4 is set to 80 minutes (=80 copies×1 minute/copy). For the same reason, the post-processing time period Tf is set to 160 minutes (=80 copies×2 minutes/copy). As a consequence, the printable copy number e associated with the subsequent print job is set to 160 copies (=160 minutes/1 minute/copy).

By the way, since the remaining copy number Z is set to 80 copies, the remaining copy number Z becomes equal to 0 bundle (=80 copies−80 copies) in the step S528 in FIG. 8. Therefore, the process proceeds from the step S529 to the step S530, wherein the answer to the question of this step is affirmative (YES), and hence the present dividing process is terminated.

It should be noted that the stacker 6 is selected as a sheet bundle discharge destination in the fourth print job J4. More specifically, the amount of sheet bundles to be stacked on the stacker 6 is set to 80 bundles.

By thus executing the print job dividing process according to the present example, split job configuration data shown in FIG. 12 by way of example is stored in the memory of the job controller 301. The print job dividing process eventually corresponds to processing for dividing a carrying process for carrying sheet bundles from a stacker to the post-processing apparatus into a plurality of processes. Further, the print job dividing process also corresponds to processing for determining the amount of sheet bundles to be stacked on a stacker for each carrying process.

Next, rescheduling of divided print jobs and additional printing will be described with reference to FIG. 9.

Figure 9:
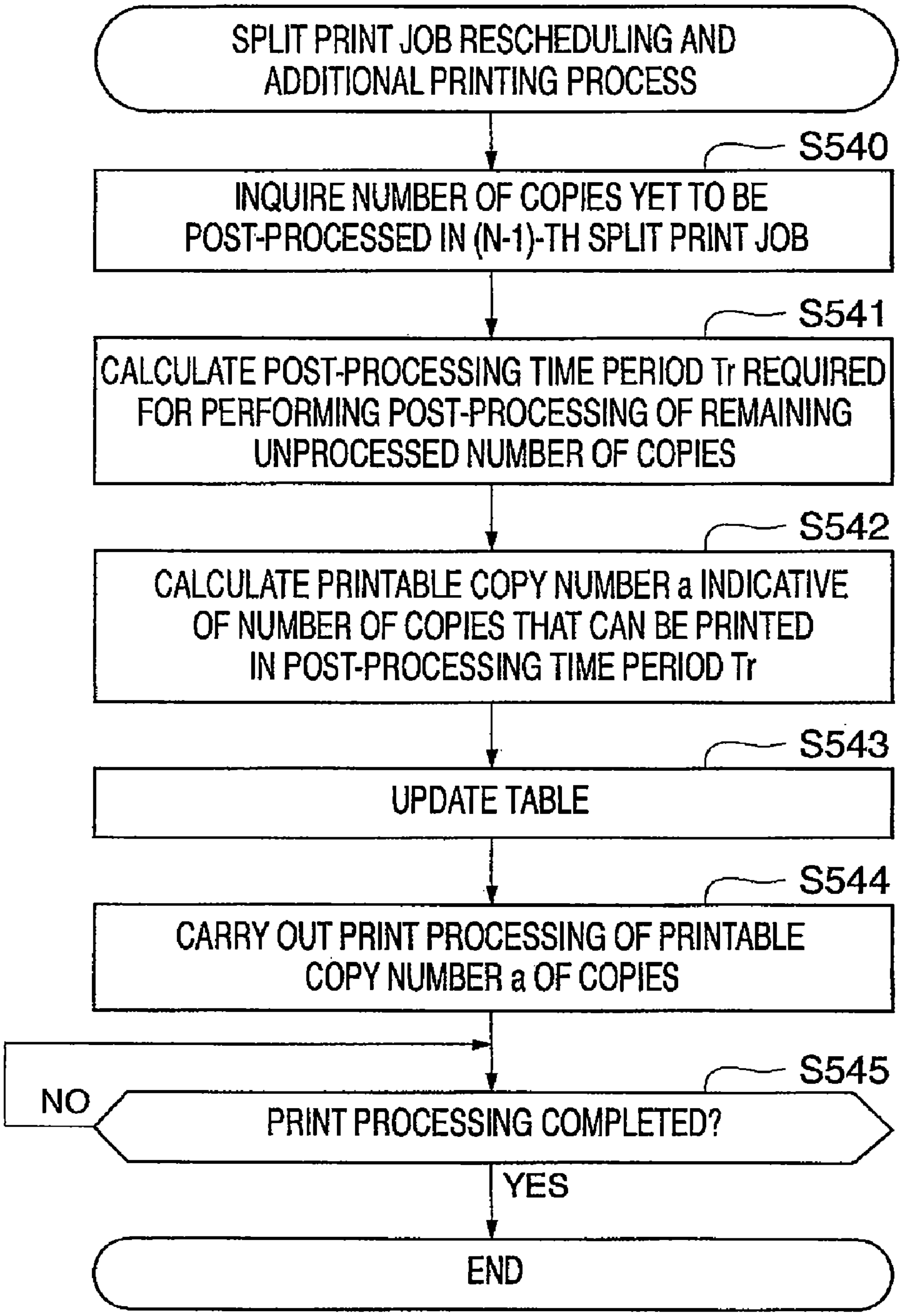
FIG. 9 is a flowchart of a divided print job rescheduling and additional printing process executed in a step S510 in FIG. 7.

FIG. 9 is a flowchart of a divided print job rescheduling and additional printing process executed in the step S510 in FIG. 7.

First, in a step S540, the controller 300 inquires, via the external interface 307, of the post-processing apparatus (case binding machine 200) as to the number of copies post-processed in an (N−1)-th divided print job immediately preceding a N-th divided print job completely processed this time. The controller 300 compares the number of copies which is acquired from the post-processing apparatus with the number of copies to be processed in the (N−1)-th divided print job (i.e. a copy number associated the (N−1)-th divided print job) and calculates the number of copies yet to be post-processed in the (N−1)-th divided print job (i.e. a remaining copy number).

In the following step S541, the controller 300 calculates a post-processing time period Tr which it takes to perform post-processing of the copy number (remaining copy number) of copies which is calculated in the step S540.

In a step S542, the controller 300 calculates a printable copy number "a" indicative of the number of copies that can be printed according to the N-th divided print job over the post-processing time period Tr calculated in the step S541.

In a step S543, the controller 300 determines the copy number associated with the N-th divided print job, based on the printable copy number "a" calculated in the step S542, updates the divided print job number of the N-th and subsequent divided print jobs, and rewrites data stored in the memory of the job controller 301.

In a step S544, the controller 300 carries out print processing of the printable copy number "a" of copies according to the N-th divided print job.

In a step S545, completion of the print processing carried out by the controller 300 in the step S544 is awaited, and when the print processing is completed (YES to S545), the present rescheduling and additional printing process is terminated.

Next, how a print job is divided and print processing and post-processing are executed, according to the flowcharts in FIGS. 6 to 8, will be described in detail by taking a print job for printing 100 sheet bundles and performing case binding processing on the sheet bundles, as an example.

Figure 10:
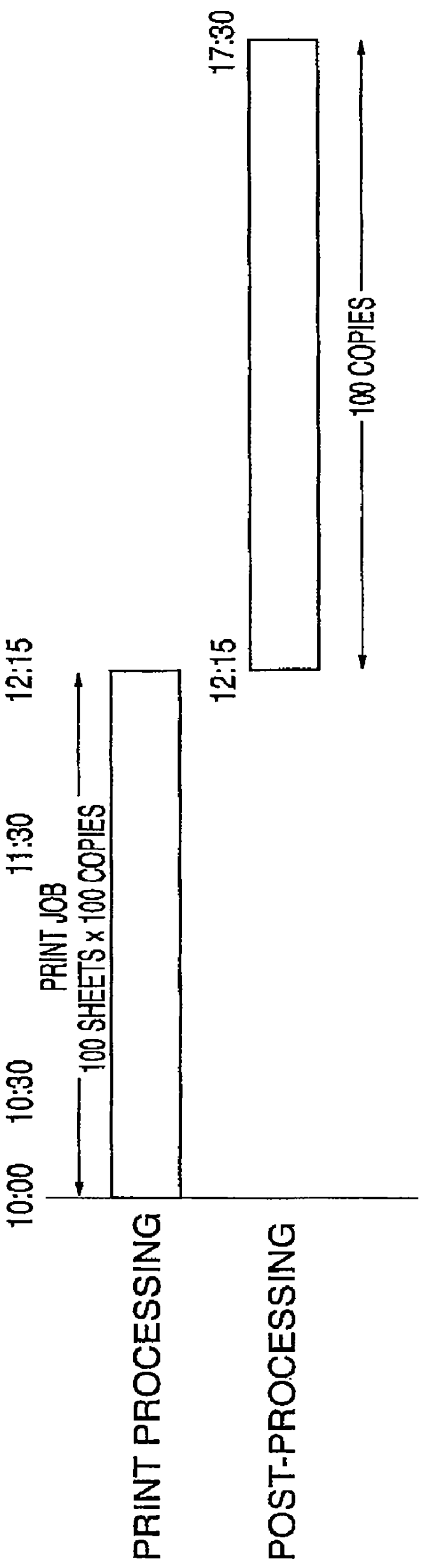
FIG. 10 is a timetable in an example of a case where print processing and post-processing are performed without dividing a print job.

Prior to the above-mentioned description, first, the operation of the controller 300 of the present printing system in a case where a print job is not divided will be described using the timetable, shown in FIG. 10, for execution of print processing and post-processing.

In execution of a print job for performing print processing and case binding processing on 100 copies, it takes 2 hours and 15 minutes to complete the print processing and 5 hours and 15 minutes to complete the post-processing (case binding processing). Therefore, if print processing is started at 10:00, the print processing is completed at 12:15, and then an operator carries sheet bundles to the case binding machine 200 and starts post-processing. In this case, if a time period required for carrying the sheet bundles to the case binding machine 200 is not taken into account, the post-processing is completed at 17:30.

Next, an example of the operation of the controller 300 of the present printing system in a case where a print job is divided will be described with reference to FIGS. 13 to 18.

Figure 13:
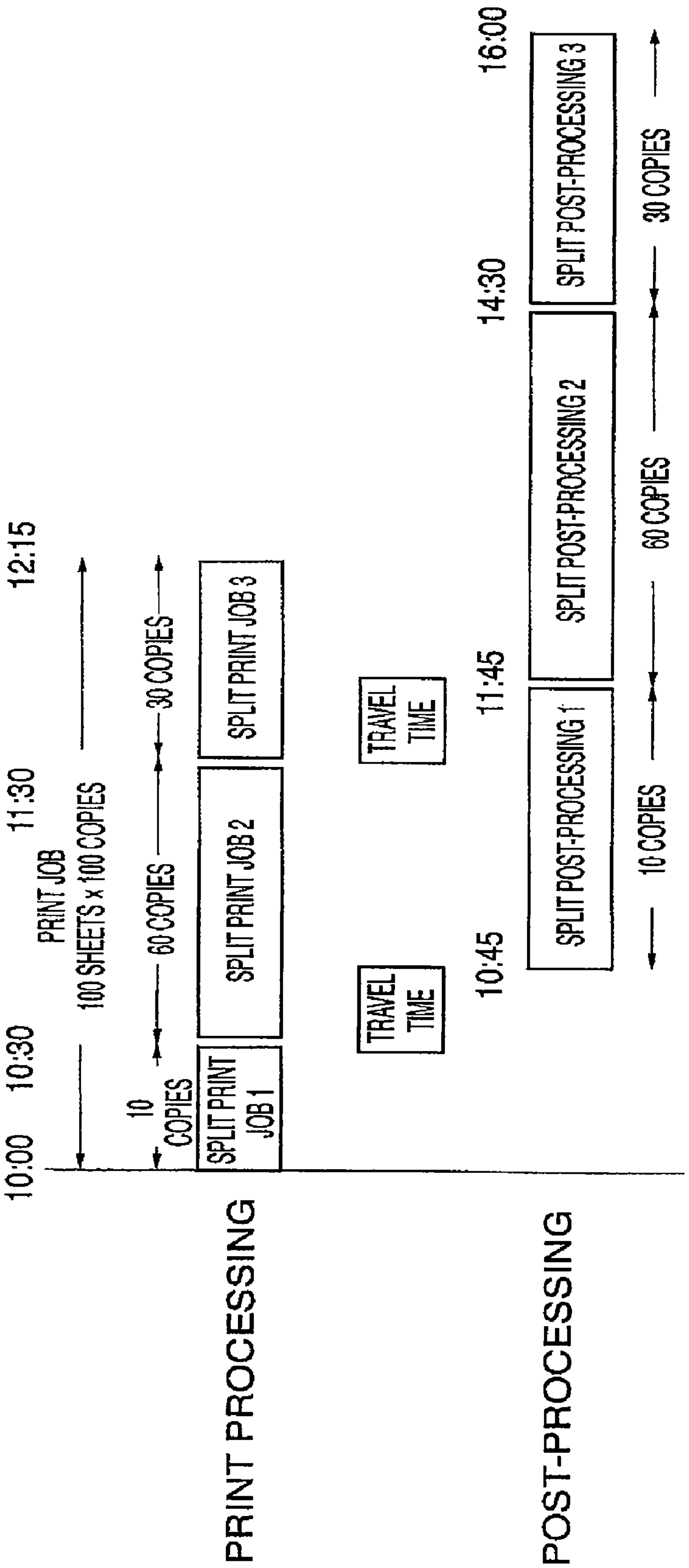
FIG. 13 is a timing diagram showing how print processing and post-processing are executed in a case where a print job is divided into three.
Figure 14:
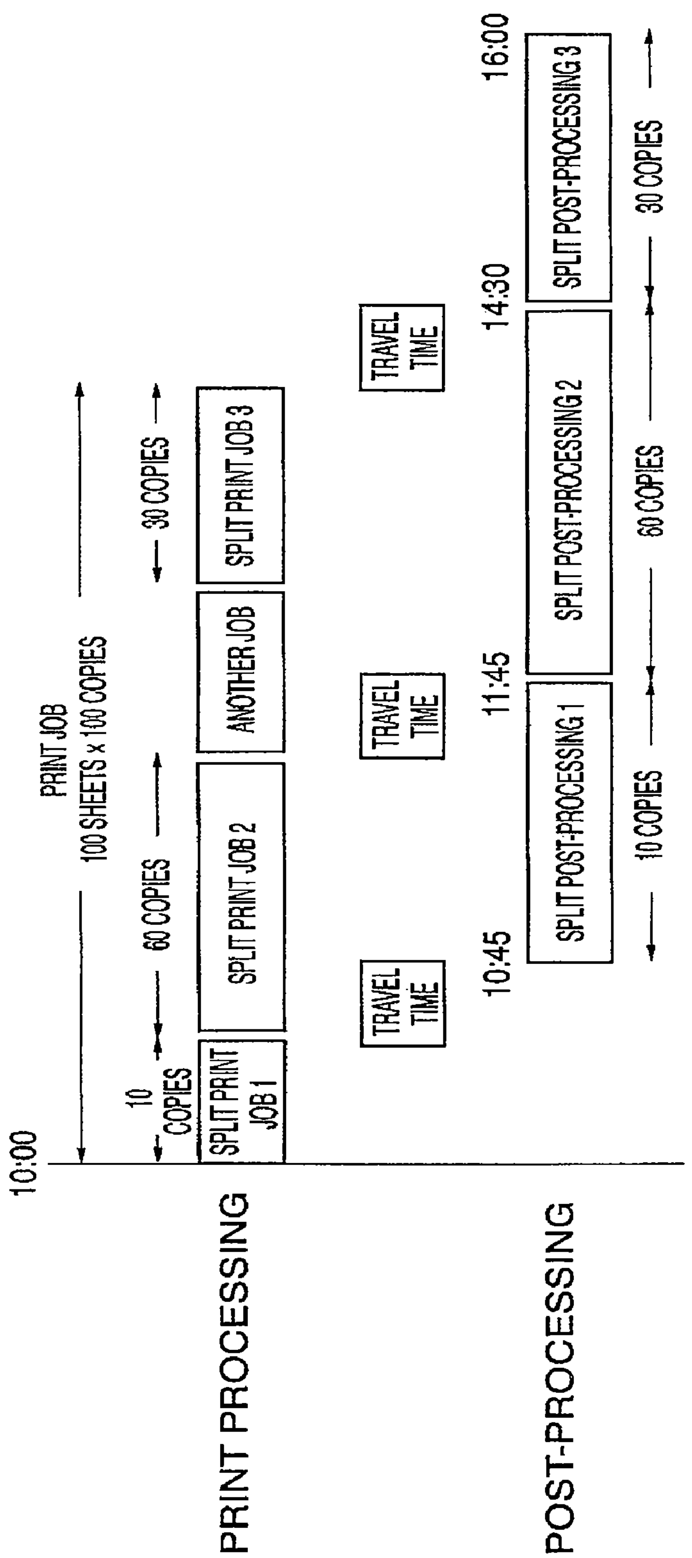
FIG. 14 is a timing diagram showing how print processing and post-processing are executed when the print processing is interrupted by a job other than divided print jobs in a case where a print job is divided into three.

FIG. 13 is a timing diagram showing how print processing and post-processing are executed in a case where a print job is divided into three. FIG. 14 is a timing diagram showing how print processing and post-processing are executed when the print processing is interrupted by a job other than divided print jobs in a case where a print job is divided into three. FIGS. 15 to 18 are views showing respective first to fourth screens displayed on the liquid crystal display section 917 (see FIG. 4).

In the illustrated examples, a print job for performing print processing and case binding processing on 100 copies is divided into three print jobs for processing 10 copies, 60 copies, and 30 copies, respectively, for execution.

When the print job is transmitted from the external apparatus 306 to the controller 300, the controller 300 stores data of the received print job in the hard disk 311. The hard disk 311 is capable of storing a plurality of print jobs, and the print jobs stored in the hard disk 311 can be checked via the operating section 60. Print jobs stored in the hard disk 311 are checked following a procedure described below.

First, a Job Status button 920 is pressed on the standard screen (see FIG. 5) displayed on the liquid crystal display section 917 of the operating section 60. Then, a screen, shown in FIG. 15 by way of example, for confirming the job status is displayed on the liquid crystal display section 917.

Figure 15:
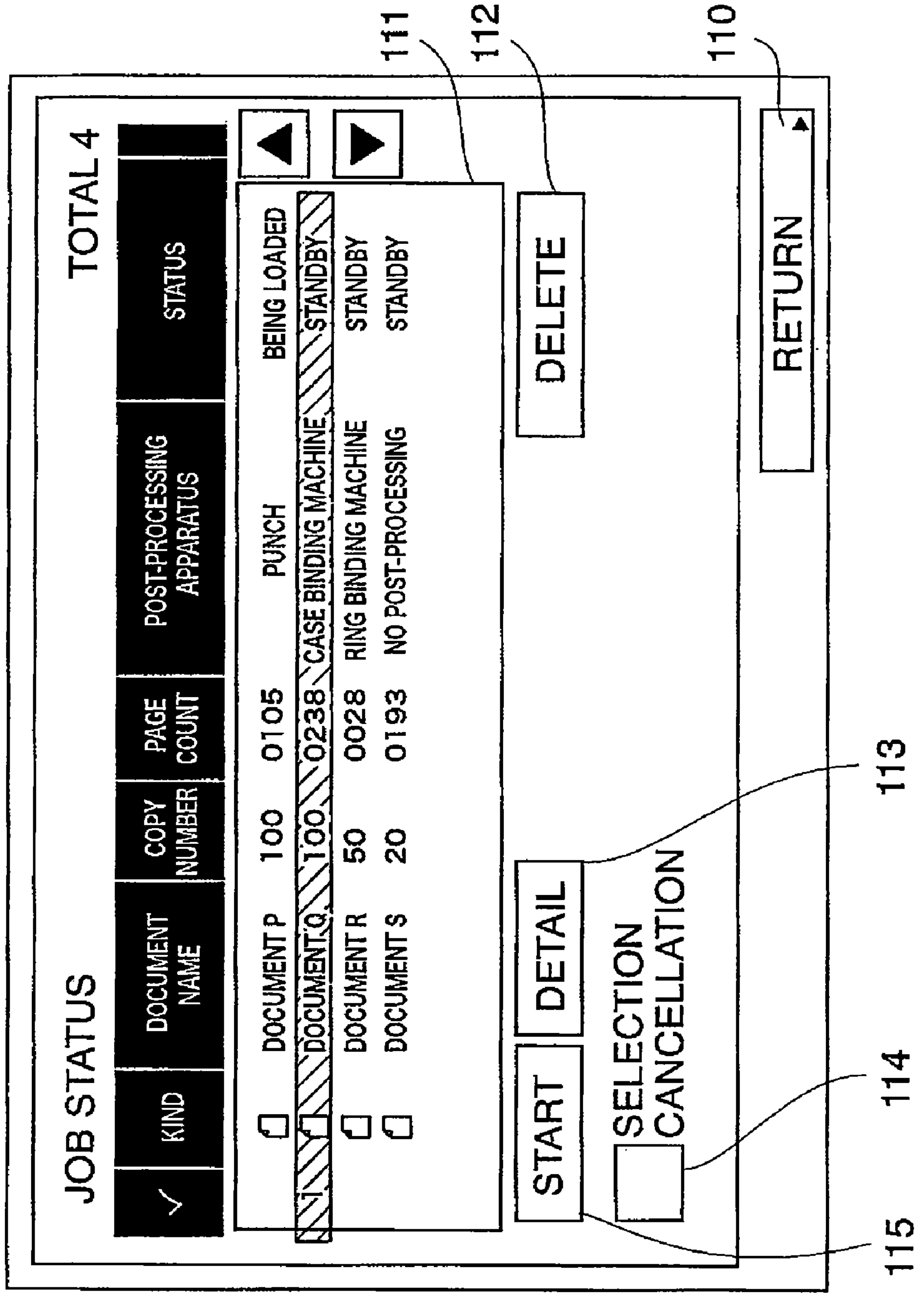
FIG. 15 is a view of a first screen displayed on the liquid crystal display section.

Now, the screen, shown in FIG. 15 by way of example, for confirming the job status will be described. Reference numeral 110 denotes a button for switching this confirmation screen back to the standard screen in FIG. 5. Reference numeral 111 denotes a display section on which are displayed the kind of a job, the document name, the number of copies, the number of pages per copy, the kind of an off-line post-processing apparatus, and a status, as to each of stored divided print jobs. In the example shown in FIG. 15, the document name "document Q" is selected. A line including the selected document name can be selected by pressing the same.

Reference numeral 112 denotes a Delete button for deleting a print job associated with the selected document, 113 a Detail button for displaying detailed information on the selected document, and 114 a button for canceling the selection. Reference numeral 115 denotes a Job Start button. When the Job Start button 115 is pressed, the processes shown in FIGS. 7 to 9 are executed. In the example shown in FIG. 15, when the Job Start button 115 is pressed, a print job associated with the document name "document Q" is started.

When the process of the flowchart shown in FIG. 7 starts to be executed, first, in the step S501 in which the controller 300 performs print job division, the operator can enter a predetermined value (step S520 in FIG. 8) as a reference for determination as to whether or not to divide the print job. In a case where the operator input is required, a popup screen shown in FIG. 16 by way of example is displayed on the liquid crystal display section 917.

On the popup screen, the operator enters a copy number (corresponding to the predetermined reference value for determination) indicative of the number of copies to be output according to the first divided print job, using the ten keys 904 to 913 of the operating section 60. In the exemplary screen shown in FIG. 16, "10" copies is entered. When an OK button 116 is pressed in this state, the copy number (predetermined value) indicative of the number of copies to be output according to the first divided print job is finally determined.

When the copy number i indicative of the number of copies to be output according to the first divided print job is finally determined, the controller 300 determines a post-processing time period Tf required for processing the copy number i of copies. When the post-processing time period Tf is determined, the copy number e indicative of the number of copies that the image forming apparatus 1 can output by executing print processing according to a subsequent divided print job before the post-processing time period Tf elapses is determined, and hence a copy number i associated with the subsequent divided print job is determined. It should be noted that the copy number associated with the subsequent divided print job may be determined based on a time period obtained by subtracting a travel time period Th (i.e. a time period required for an operator to take out sheet bundles from the image forming apparatus 1, carry the sheet bundles to the post-processing apparatus 200, and completely set these in the sheet feeder 201 of the post-processing apparatus 200) from the post-processing time period Tf.

Figure 16:
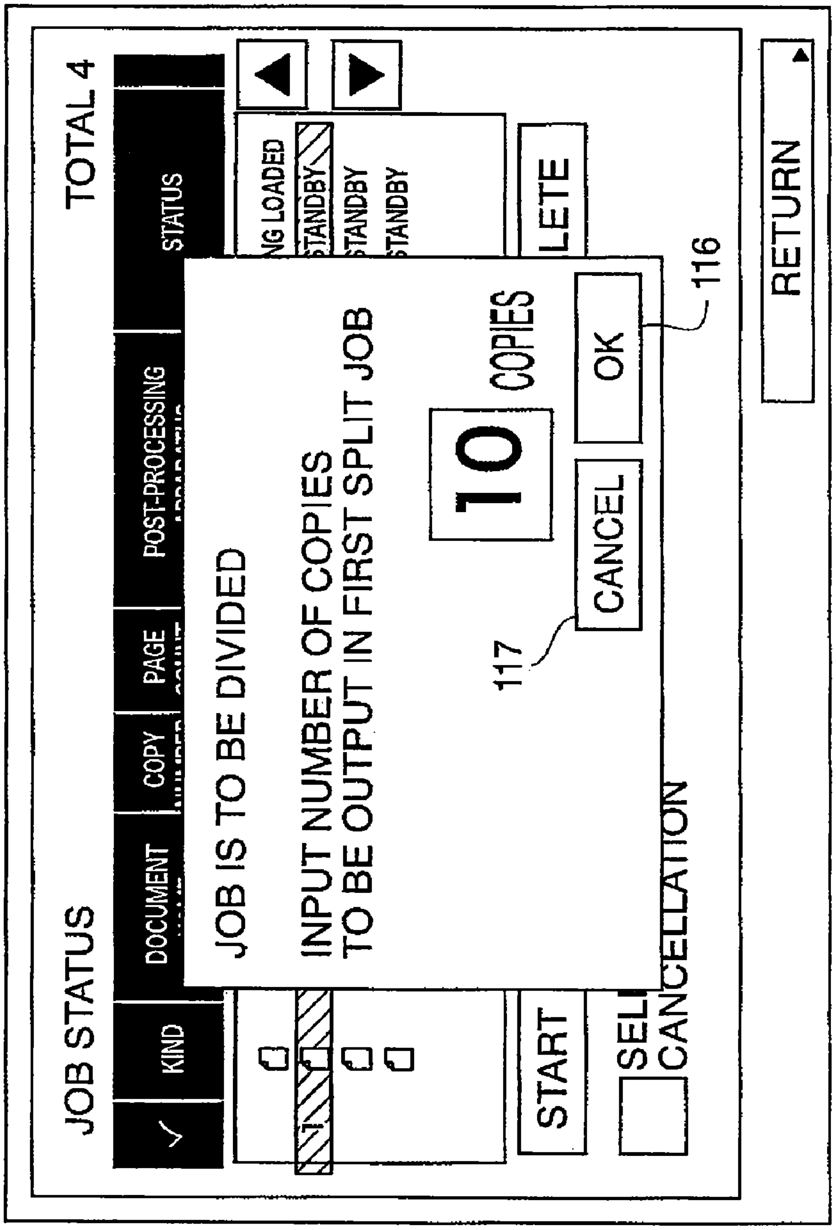
FIG. 16 is a view of a second screen displayed on the liquid crystal display section.
Figure 17:
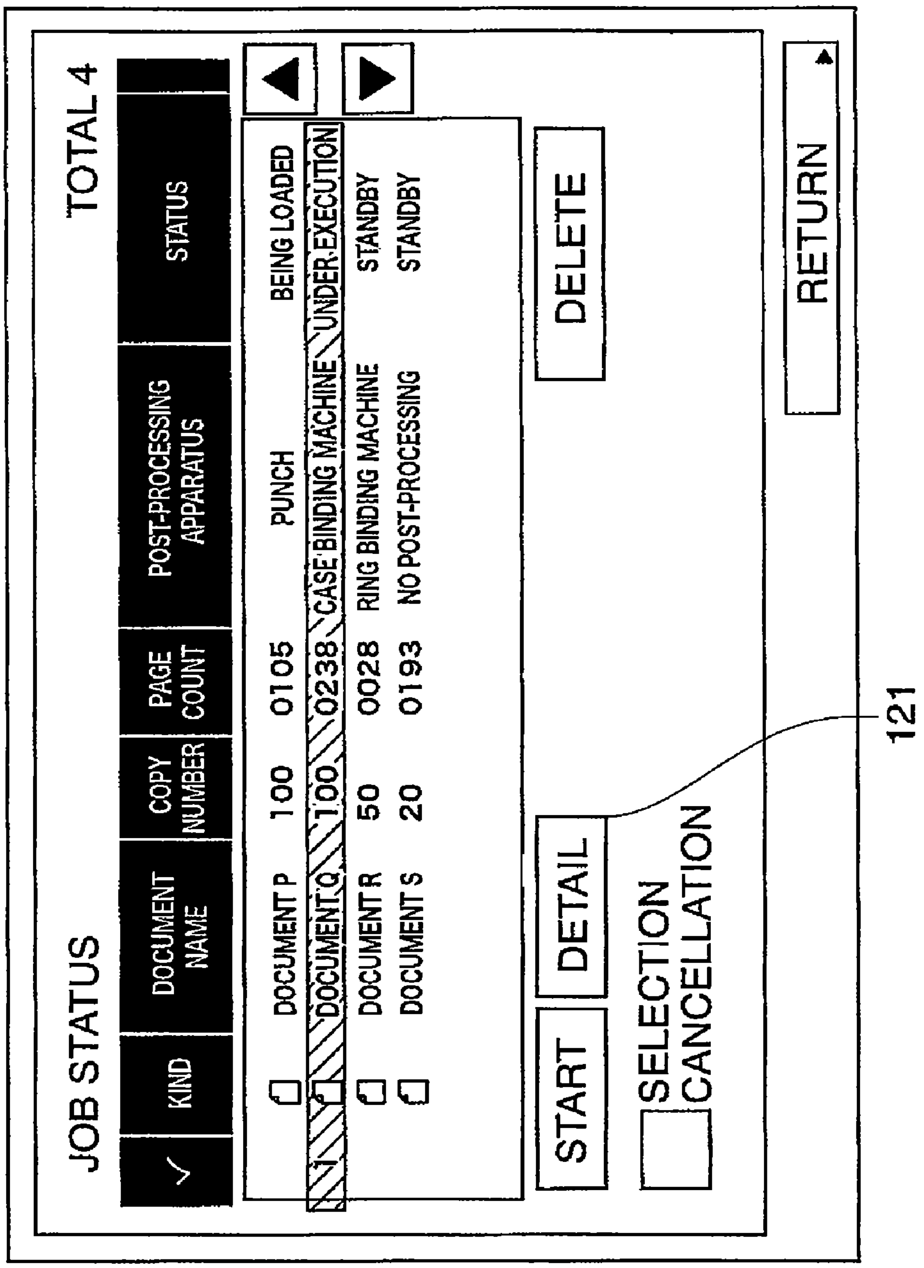
FIG. 17 is a view of a third screen displayed on the liquid crystal display section.
Figure 18:
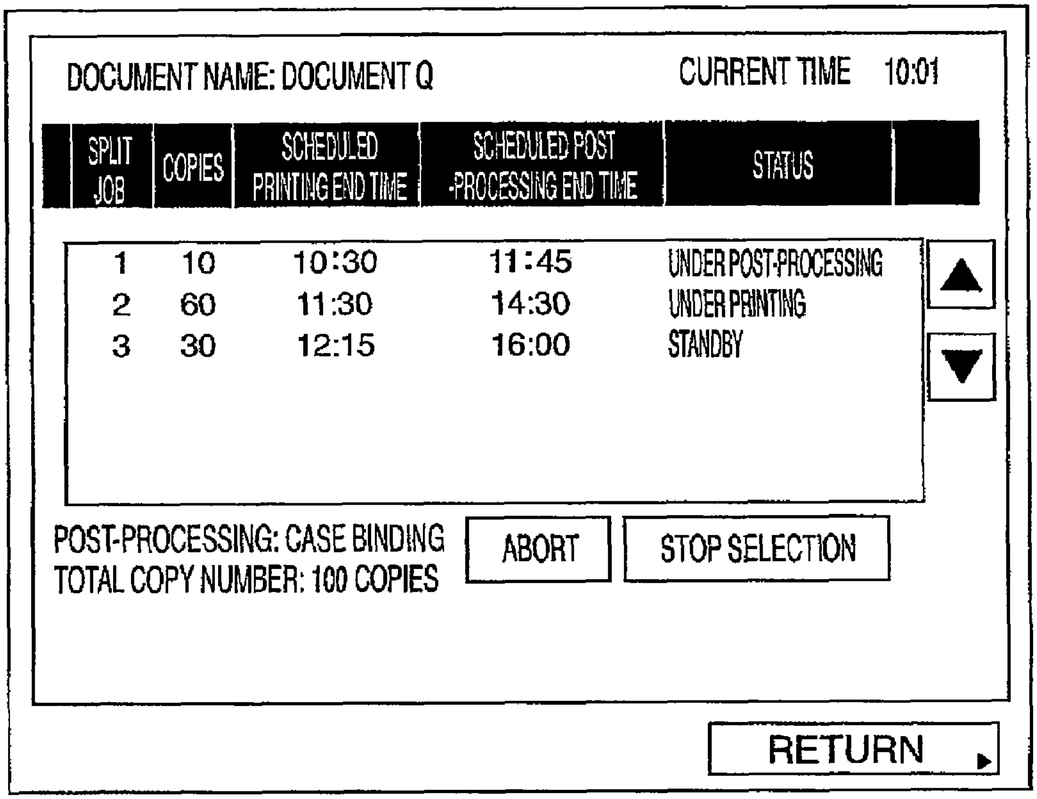
FIG. 18 is a view of a fourth screen displayed on the liquid crystal display section.

When the operator presses the OK button 116 on the popup screen shown in FIG. 16, the first divided print job is started, and a screen shown in FIG. 17 is displayed on the liquid crystal display section 917. On the other hand, when the Cancel button 117 is pressed, the screen is switched back to the screen shown in FIG. 15, without execution of print job division. When the Detail button 121 is pressed while the screen shown in FIG. 17 is displayed on the liquid crystal display section 917, a screen shown in FIG. 18 is displayed on the liquid crystal display section 917 (display unit)(display step).

When the OK button 116 is pressed on the popup screen shown in FIG. 16, the controller 300 (calculation unit) executes print processing and post-processing according to the exemplary schedule shown in FIG. 13 (calculation step). More specifically, when the first divided print job 1 (first divided print job) for performing print processing on 10 copies is to be started at 10:00, the scheduled end time of the processing (image formation scheduled end time) is set to 10:30. The operator takes out sheet bundles from the image forming apparatus 1 at 10:30, carries the sheet bundles by cart, and sets these in the post-processing apparatus 200 to start post-processing at 10:45. On the other hand, the subsequent divided print job 2 (second divided print job) for performing print processing on 60 copies is started at 10:30, and ends at 11:30 a little earlier than 11:45 (post-processing scheduled end time) at which the post-processing executed according to the divided print job 1 is scheduled to be completed. The time 11:30 is determined by subtracting a time period (second time period) required for travel of sheet bundles from the post-processing scheduled end time. More specifically, image forming processing according to the second divided print job is completed during a third time period (11:30-10:45) obtained by subtracting the second time period from the first time period (11:45-10:45) required for execution of the post-processing according to the first divided print job.

Then, a divided print job 3 for performing print processing on 30 copies is executed. The operator takes out the sheet bundles having undergone the print processing according to the divided print job 2, which ended at 11:30, and brings the sheet bundles to the post-processing apparatus 200 exactly at 11:45 when the post-processing executed according to the divided print job 1 is scheduled to be completed. This makes it possible to cause the post-processing apparatus 200 to immediately start post-processing according to the divided print job 2. The post-processing according to the divided print job 2 is scheduled to be completed at 14:30, and therefore the operator has only to bring the sheet bundles processed according to the divided print job 3 from the image forming apparatus 1 to the post-processing apparatus 200 before a time set by subtracting the time period required for travel of sheet bundles from the time 14:30.

It should be noted that an exemplary schedule shown in FIG. 14 may be employed in addition to the exemplary schedule shown in FIG. 13. More specifically, when it can be expected, as shown in FIG. 13, that the post-processing apparatus 200 will be executing the preceding divided print job 2 even after completion of print processing for 30 copies according to the divided print job 3, the exemplary schedule shown in FIG. 13 may be changed to the exemplary schedule shown in FIG. 14. In this case, the image forming apparatus 1 carries out another job prior to the print processing according to the divided print job 3 such that the job other than the divided print jobs ends before the time to start post-processing to be executed according to the divided print job 3. However, the interrupt job has to be a print job having an amount small enough to be completely printed before 14:15.

As described above, division of a print job makes it possible to enhance the productivity of the overall operation including post-processing, as well as to reduce occurrence of a state where printed and yet-to-be-post-processed sheet bundles remain on a floor around the image forming apparatus 1 or within a stacker.

Next, the divided print job rescheduling and additional printing process executed following the flowchart shown in FIG. 9 will be described in detail with reference to FIGS. 19 to 21.

Figure 19:
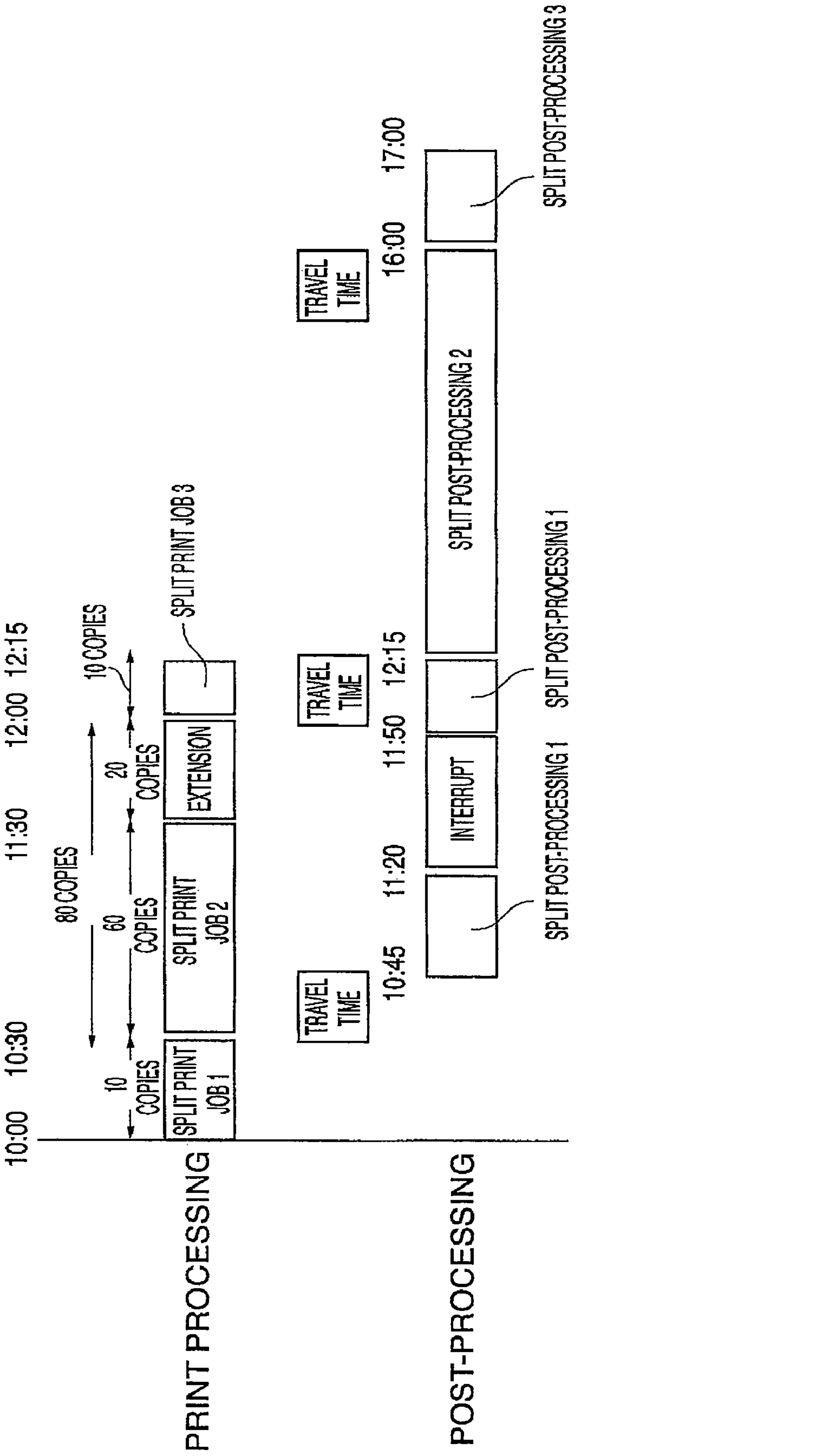
FIG. 19 is a timing diagram showing how print processing and post-processing are executed when the post-processing is interrupted by another job in a case where a print job is divided into three.

FIG. 19 is a timing diagram how print processing and post-processing are executed when the post-processing is interrupted by another job in a case where a print job is divided into three. FIGS. 20 and 21 are views showing respective fifth and sixth screens displayed on the liquid crystal display section 917 (see FIG. 4).

In the present example, it is assumed that a print job for print processing and case binding processing of 100 copies is divided into three print jobs for processing 10 copies, 60 copies, and 30 copies, respectively, and executed.

Following the exemplary schedule shown in FIG. 19, the image forming apparatus 1 starts the divided print job 1 at 10:00, normally ends the same at 10:30, and then starts the divided print job 2. On the other hand, the post-processing apparatus 200 starts post-processing according to the divided print job 1 at 10:45, but an interrupt of another job is generated at 11:20 during the post-processing, which interrupts execution of the post-processing according to the divided print job 1.

In this case, at 11:30 when the image forming apparatus 1 completes print processing according to the divided print job 2, the operating state of the post-processing apparatus 200 is checked. At this time, the post-processing apparatus 200 is operating the interrupt job, and the post-processing according to the divided print job 1 has been left half-processed. For this reason, a time period required for completing both the remaining part of the interrupt job and the remaining part of the post-processing according to the divided print job 1 to be performed after completion of the interrupt job is calculated. Then, a copy number (extended output copy number) indicative of the number of copies that the image forming apparatus 1 can print by the print processing according to the divided print job 2 before the required time period elapses is calculated. The number of copies to be output according to the divided print job 2 is increased, and the number of copies to be output according to the divided print job 3 is reduced, by a value corresponding to the calculated copy number (20 copies in the example shown in FIG. 19). As a consequence, the scheduled end time of the divided print job 2 changes, and hence the associated data stored in the memory of the job controller 301 is updated. Then, the image forming apparatus 1 executes the print processing (extended part) according to the divided print job 2.

As a result, the image forming apparatus 1 ends the print processing (extended part) according to the divided print job 2 at 12:00, and then starts print processing according to the divided print job 3. On the other hand, the post-processing apparatus 200 completes the post-processing according to the divided print job 1 at 12:15, which makes it possible to start post-processing according to the divided print job 2 immediately without waste of time.

Figure 20:
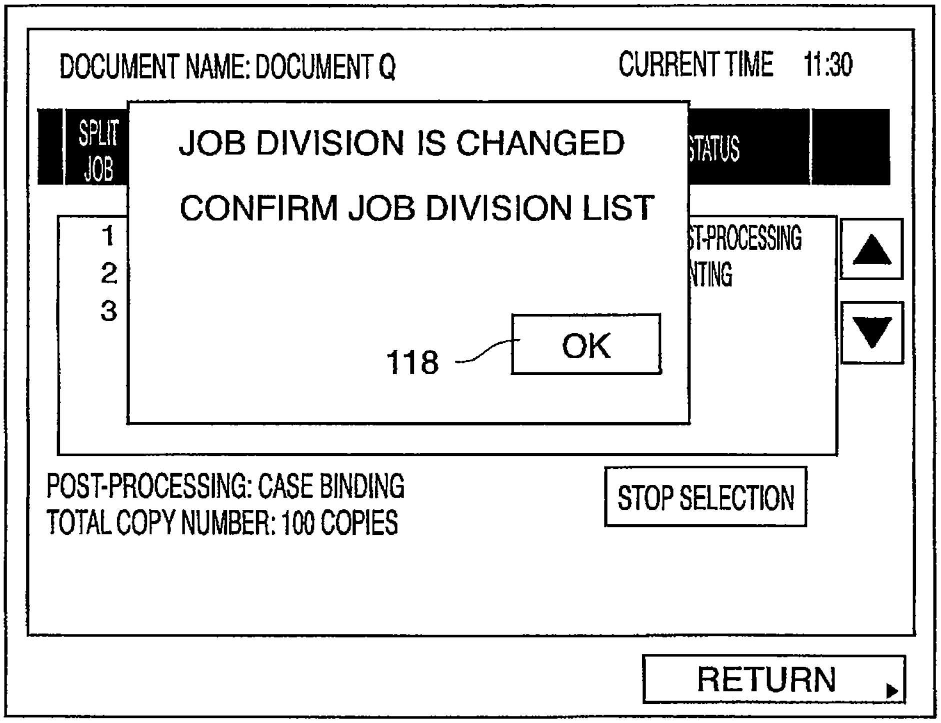
FIG. 20 is a view of a fifth screen displayed on the liquid crystal display section.
Figure 21:
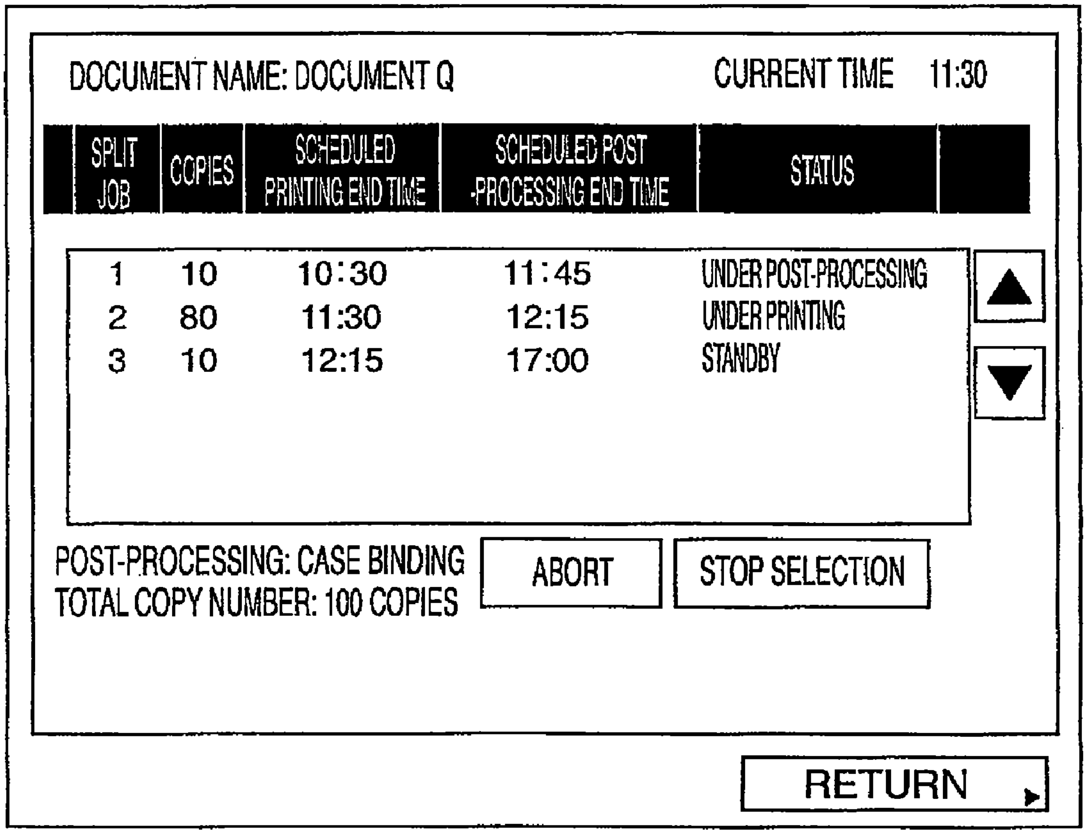
FIG. 21 is a view of a sixth screen displayed on the liquid crystal display section.

It should be noted that when a copy number associated with a divided print job changes, the screen shown in FIG. 20 is displayed for confirmation of a list of split jobs. When the operator presses an OK button 118 on this screen, the screen shown in FIG. 21 is displayed, so that the operator can confirm the updated scheduled end time of the divided print job.

As described above, according to the present embodiment, the image forming apparatus is capable of dividing a print job into a plurality of print jobs according to the processing capability of a post-processing apparatus to thereby enable parallel operation between the image forming apparatus and the post-processing apparatus. This makes it possible to carry out image forming processing and post-processing efficiently.

Although in the above description, a plurality of stackers are provided, the present invention can also be applied to a case where only one stacker is provided. When there is a single stacker provided, both printing operation and stacking operation are suspended whenever a divided print job is completed. An operator takes out sheet bundles stacked on the tray of the stacker after the stacking operation having been suspended, and carries the sheet bundles to a post-processing apparatus. A spare tray is set on the stacker. In response to removal of the sheet bundles from the stacker, a subsequent divided print job is executed, and the stacking operation is restarted. This control operation makes it possible to shorten a time period from the start of a print job to the completion of post-processing.

It is to be understood that the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

INDUSTRIAL APPLICABILITY

The present invention is applied to an image forming apparatus, such as a printer, and makes it possible to divide a print job input to the image forming apparatus into a plurality of print jobs according to the processing capability of a post-processing apparatus to thereby enable parallel operation between the image forming apparatus and the post-processing apparatus. Thus, image forming processing and post-processing can be performed efficiently, which makes it possible to enhance productivity.

The invention claimed is:

1. An image forming apparatus comprising:

an image forming unit configured to form images on sheets based on an input print job;

a stacker unit configured to stack a plurality of sheets which are to be carried to a post-processing apparatus that performs post-processing on sheets, said stacker unit stacking the sheets having images formed thereon by said image forming unit; and a control unit configured to determine an amount of sheets to be stacked on said stacker unit such that an input single print job is divided, based on per-hour processing capability of said image forming unit and per-hour processing capability of the post-processing apparatus.

2. An image forming apparatus as claimed in claim 1, wherein the amount of sheets determined by said control unit corresponds to an amount of sheets to be carried from said stacker unit to the post-processing apparatus in a single carrying operation in a single print job.

3. An image forming apparatus as claimed in claim 2, wherein said control unit determines the amount of sheets to be carried in each of a plurality of carrying operations.

4. An image forming apparatus as claimed in claim 1, wherein said stacker unit has a plurality of stacking devices, and said control unit determines the amount of sheets to be stacked on each of the stacking devices.

5. An image forming apparatus as claimed in claim 1, further comprising a communication unit configured to communicate with the post-processing apparatus, and wherein said control unit acquires the per-hour processing capability of the post-processing apparatus from the post-processing apparatus via said communication unit.

6. An image forming apparatus comprising:

a stacker unit configured to stack a plurality of sheets which are to be carried to a post-processing apparatus that performs post-processing on sheets, an image forming unit configured to form images on the sheets to be stacked on said stacker unit, based on an input print job; and a control unit configured to divide an input single print job into a plurality of print parts based on per-hour processing capability of said image forming unit and per-hour processing capability of the post-processing apparatus and control stacking of sheets on said stacker unit according to a result of dividing of the print job.

7. An image forming apparatus as claimed in claim 6, wherein said control unit divides the print job such that during a time period over which the post-processing apparatus performs post-processing associated with a first print part executed first of all the print parts, said image forming unit can complete image formation associated with a second print part executed in succession to the first print part.

8. An image forming apparatus as claimed in claim 6, wherein said control unit divides the print job such that during a third time period obtained by subtracting a second time period required for carrying sheets stacked on said stacker unit to the post-processing apparatus from a first time period over which the post-processing apparatus performs post-processing associated with a first print part executed first of all the print parts, said image forming unit can complete image formation associated with a second print part executed in succession to the first print part.

9. An image forming apparatus as claimed in claim 6, further comprising a communication unit configured to communicate with the post-processing apparatus, and a processing capability collecting unit configured to collect processing capability of the post-processing apparatus.

10. An image forming apparatus as claimed in claim 6, further comprising a communication unit configured to communicate with the post-processing apparatus, and an operating state-detecting unit configured to detect an operating state of the post-processing apparatus via said communication unit, and wherein if the operating state of the post-processing apparatus detected by said operating state-detecting unit indicates that the post-processing apparatus is performing post-processing associated with a first print part executed first of all the print parts when said image forming unit completes image formation associated with a second print part executed second of all the print parts, said control unit changes a copy number set for image formation in association with the second print part.

11. An image forming apparatus as claimed in claim 6, further comprising a communication unit configured to communicate with the post-processing apparatus, and an operating state-detecting unit configured to detect an operating state of the post-processing apparatus via said communication unit, and wherein if the operating state of the post-processing apparatus detected by said operating state-detecting unit indicates that the post-processing apparatus is performing post-processing associated with a first print part executed first of all the print parts when said image forming unit starts image formation associated with a second print part executed second of all the print parts, said control unit changes a copy number set for image formation in association with the second print part.

12. An image forming apparatus as claimed in claim 10, wherein said control unit changes the copy number set for image formation in association with the second print part, to a copy number which allows image formation to be completed before completion of the post-processing associated with the first print part.

13. An image forming apparatus as claimed in claim 12, further comprising a display unit, wherein said control unit causes a scheduled time of image formation termination and a scheduled time of post-processing termination associated with each of the second print part and other print parts to be executed after completion of the second print part based on the changed copy number set for image formation.

14. A print job processing method applied to an image forming apparatus including an image forming unit configured to form images on sheets based on an input print job, and a stacker unit configured to stack a plurality of sheets each having an image formed thereon by the image forming unit, the image forming apparatus being configured to perform communication with a post-processing apparatus for performing post-processing on a plurality of sheets brought from the image forming unit, the print job processing method comprising:

a print job dividing step of dividing an input single print job into a plurality of print parts based on per-hour processing capability of the image forming unit and per-hour processing capability of the post-processing apparatus; and a control step of controlling stacking of sheets on the stacker unit according to the print parts obtained by division in said print job dividing step.

15. A non-transitory, computer-readable storage medium that stores a program for causing a computer to execute a print job processing method applied to an image forming apparatus including an image forming unit configured to form images on sheets based on an input print job, and a stacker unit configured to stack a plurality of sheets each having an image formed thereon by the image forming unit, the image forming apparatus being configured to perform communication with a post-processing apparatus for performing post-processing on a plurality of sheets brought from the image forming unit, wherein the print job processing method comprises:

a print job dividing step of dividing an input single print job into a plurality of print parts based on per-hour processing capability of the image forming unit and per-hour processing capability of the post-processing apparatus; and a control step of controlling stacking of sheets on the stacker unit according to the print parts obtained by division in said print job dividing step.

* * * * *